United States Patent [19]
Sato et al.

[11] Patent Number: 5,716,118
[45] Date of Patent: Feb. 10, 1998

[54] IMAGING OPTICAL SYSTEM

[75] Inventors: Akira Sato, Otsu; Soh Ohzawa, Tononaka; Katsuhiro Takamoto, Nagaokakyo, all of Japan

[73] Assignee: Minolta Co., Ltd., Osaka, Japan

[21] Appl. No.: 732,702

[22] Filed: Oct. 18, 1996

[30] Foreign Application Priority Data

Oct. 25, 1995 [JP] Japan ................... 7-277364
Sep. 12, 1996 [JP] Japan ................... 8-241952

[51] Int. Cl.⁶ ........................ G03B 21/28
[52] U.S. Cl. ............ 353/98; 353/77; 353/69
[58] Field of Search ................ 353/69, 70, 98, 353/76, 77, 78, 74; 359/867, 868, 869

[56] References Cited

U.S. PATENT DOCUMENTS 5,096,288  3/1992  Yano et al. .
5,274,406  12/1993  Tejima et al. .
5,422,691  6/1995  Ninomiya et al. .
5,442,413  8/1995  Tejima et al. .
5,499,067  3/1996  Shibazaki ..................... 353/78

FOREIGN PATENT DOCUMENTS 4107521  4/1992  Japan .

*Primary Examiner*—William Dowling
*Attorney, Agent, or Firm*—Price, Gess & Ubell

[57] ABSTRACT

An imaging optical system transmits a primary image. The optical system does not form an intermediate image. The primary image is projected on a screen as a secondary image. The optical system has a projection optical system and a reflection optical system. An optical axis of the reflection optical system forms an angle other than 90° with respect to a screen-side image surface.

6 Claims, 23 Drawing Sheets

L1

2mm

2mm 0.5mm

2mm 0.5mm 0.5mm

IMAGING OPTICAL SYSTEM

BACKGROUND OF THE INVENTION

1. Field of the Invention

The present invention relates to such an imaging optical system for transmitting a primary image to form a secondary image that is suitably used in image projection devices and image reading devices, and more specifically to an imaging optical system whose optical axis forms an angle other than a right angle with respect to the image surface (hereinafter referred to as an oblique imaging optical system).

2. Description of the Prior Art

Conventionally, there have been proposed various image projection devices that project onto a screen a magnified image of an image formed on a film or liquid crystal display. Such image projection devices, however, are inconveniently becoming larger and larger these days, as larger screens are manufactured, and it is now required that the space for the optical paths of an imaging optical system, which takes the most space inside an image projection device, be reduced. One way of reducing the space for the optical paths of an imaging optical system is to project an image obliquely onto a screen.

An imaging optical system of this type will be described below, with reference to FIGS. 31A and 31B. FIG. 31A is an outline diagram showing an image projection device using a conventional imaging optical system that projects an image straight onto a screen. FIG. 31B is an outline diagram showing an image projection device using an imaging optical system that projects an image obliquely onto a screen.

In the conventional device shown in FIG. 31A, when the screen 101 is made larger, the space for the optical paths occupied by the imaging optical system 100 becomes larger. For this reason, the reduction in size of the device as a whole is not realized.

On the other hand, in the device using an oblique imaging optical system, as shown in FIG. 31B, it is possible to place the imaging optical system 100' closer to the screen 101'. Thus, the use of an oblique imaging optical system allows both the screen to be made larger, and the imaging optical system to be made smaller. This is especially effective in making an image projection device slimmer. Moreover, in such a construction, the greater the angle of incidence of the light beam traveling from the projection optical system 100' to the screen 101' is (desirably more than 45°), the more effectively the device can be made slimmer.

Moreover, such an oblique imaging optical system can be used not only as an enlargement optical system in an image projection device, but also as a reduction optical system in an image reading device. FIG. 32 is an outline diagram showing an example of such an image reading device. The device of FIG. 32 uses an oblique imaging optical system 200 to project a reduced image of an image on an image reading surface 202 onto a CCD 201. Also in an image reading device like this, if an image can be read from an oblique direction at an angle of 45° or more with respect to the normal of the image reading surface 202, the image reading device can effectively be made flatter even with a larger image reading area.

As explained with the examples above, an oblique imaging optical system is effective both in making a device having such an optical system slimmer and in making the image area larger. However, in an oblique imaging optical system, the greater the angle between the image surface and the optical axis of a light beam incident on it becomes, the more noticeable the effect of trapezoid-shaped distortion, generally called keystone distortion, becomes. For this reason, various oblique imaging optical systems have conventionally been proposed with the intention of eliminating such distortion.

For example, the publication of Japanese Laid-Open Patent Application No. H4-107521 discloses the adoption of a projection optical system consisting of first and second afocal optical systems with a Fresnel reflection mirror disposed between those optical systems. In this optical system, the first afocal optical system forms an enlarged image of an original image on the Fresnel reflection mirror as an intermediate image, and then the second afocal optical system projects an enlarged image of this intermediate image onto a screen that is inclined at a predetermined angle. In this way, the distortion of the obtained projected image is expected to be corrected.

However, according to the publication of the above-mentioned prior art, it is necessary to form a real image once in the middle of the optical system, and accordingly the first and second projection optical systems require very complex lens constructions. Moreover, as a result of including an optical device to form a real image, the total length of the optical system inevitably becomes longer, and therefore such an optical system is far from making effective use of the benefit that an oblique projection optical system affords. Furthermore, the Fresnel reflection mirror, on which the intermediate real image is projected, is a very special optical device, and is not easy to manufacture.

These problems arise also when such an imaging optical image is applied to image reading devices.

SUMMARY OF THE INVENTION

An object of the present invention is to provide an imaging optical system that is compact and substantially distortion-free despite its simple construction without any special optical element.

To achieve the above object, according to the present invention, an imaging optical system for transmitting a primary image to form an enlarged or reduced secondary image without forming an intermediate image in the middle of optical paths is provided with a projection optical system, and a reflection optical system having a positive power and disposed in such a way that its optical axis forms an angle other than a right angle with respect to a enlargement-side image surface. All principal rays between said reflection optical system and said enlargement-side image surface form a uniform angle with respect to the enlargement-side image surface. A base ray incident on a reflection surface of said reflection optical system forms an angle of 90° or less with respect to a base ray reflected by the reflection optical system.

Alternatively, in the imaging optical system as described above, a normal of the reflection surface of said reflection optical system has a direction approximately identical with a normal of a reduction-side image surface and does not have a direction approximately identical with an optical axis of said projection optical system.

Alternatively, in the imaging optical system as described above, optical elements constituting said projection optical system are arranged symmetrically about an axis.

Alternatively, in the imaging optical system as described above, all principal rays between said projection optical system and a reduction-side image surface form a uniform angle with respect to the reduction-side image surface.

Note that, in the present specification, a "principal ray" denotes a light ray passing through the center of a light beam traveling from a particular object point, and a "base ray" denotes a light ray passing through the center of a light beam traveling from the origin of the reduction-side image surface to the origin of the enlargement-side image surface.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, a description will be given as to the principle of distortion correction in the imaging optical system of the present invention, with reference to the drawings. Note that, for the sake of simplicity, the following description deals with, as an example, an enlargement projection optical system that has an object surface at its reduction-side end and an image surface at its enlargement-side end.

Figure 13:
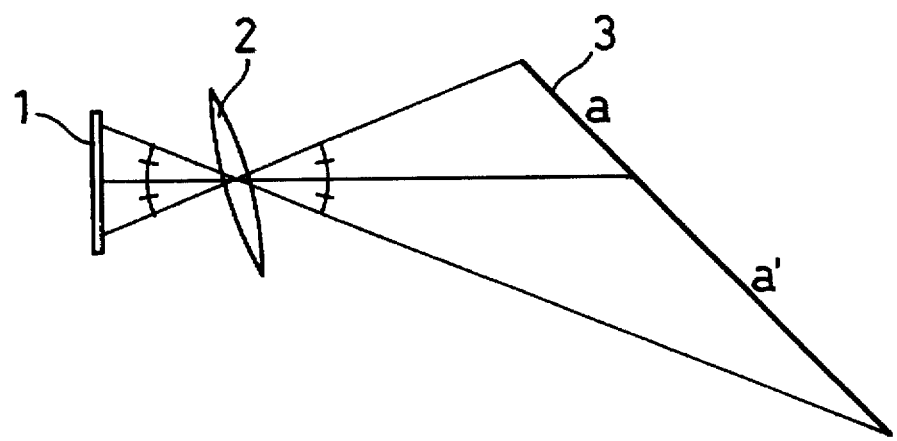
FIG. 13 is an outline diagram showing how distortion arises.

FIG. 13 is an outline diagram showing how an image on the object surface 1 is projected obliquely onto the image surface 3 by use of a projection optical system 2 that does not include a greatly decentered surface. As shown in the figure, when principal rays hit the image surface from greatly inclined directions, two object points on the object surface that have the same distance from the intersection between the object surface and the optical axis of the projection optical system result in two image points on the image surface that have greatly different distances a and a' from the intersection between the image surface and the projection optical system. The thus arising differences in magnification are the cause of a type of distortion that is called keystone distortion.

Figure 14:
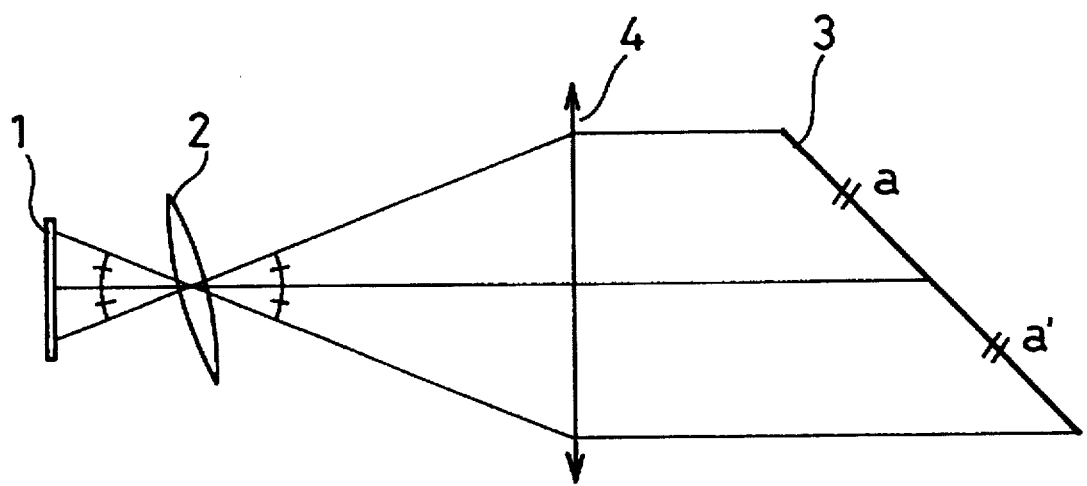
FIG. 14 is an outline diagram showing how distortion is corrected in the imaging optical system of the present invention.

FIG. 14 is an outline diagram showing the basic concept of how distortion is corrected in the imaging optical system of the present invention. In the optical system of FIG. 14, between the projection optical system 2 and the image surface 3 is disposed another optical system 4 having a positive power. In this arrangement, if this positively-powered optical system is disposed in such a way that principal rays form a uniform angle with respect to the image surface, the above-mentioned distances a and a' can be made approximately equal.

In this way, by disposing a positively-powered optical system, keystone distortion can be corrected effectively. According to the principle of distortion correction in the imaging optical system of the present invention, it is not necessary to form an intermediate image in the middle of optical paths. As a result, it is possible to shorten the total length of the imaging optical system and to reduce the number of lenses used in the projection optical system.

Moreover, in the imaging optical system of the present invention, principal rays incident on the screen disposed on the image surface form a uniform angle with respect to the image surface. Accordingly, it is possible to disperse all the light rays that hit the whole screen from the same direction, toward the direction of the observer. This makes it easy to produce a directional screen with which images can be observed only from a given direction.

Figure 15:
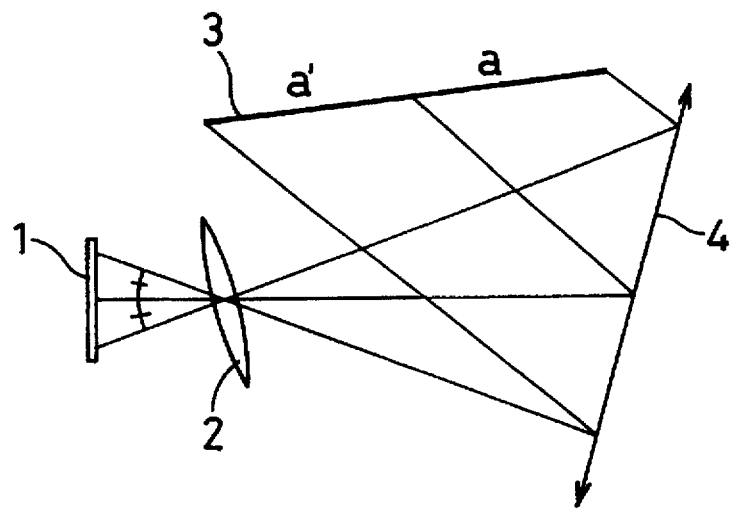
FIG. 15 is an outline diagram showing how distortion is corrected in the imaging optical system of the present invention.

Furthermore, in the imaging optical system of the present invention, as shown in FIG. 15, the positively powered optical system 4 that is added to correct distortion is a reflection optical system. This contributes to reducing the space occupied by the whole optical system. However, it is not sufficient to use a reflection optical system simply as the positively powered optical system without further consideration, because it inconveniently causes new distortion of its own.

Figure 16:
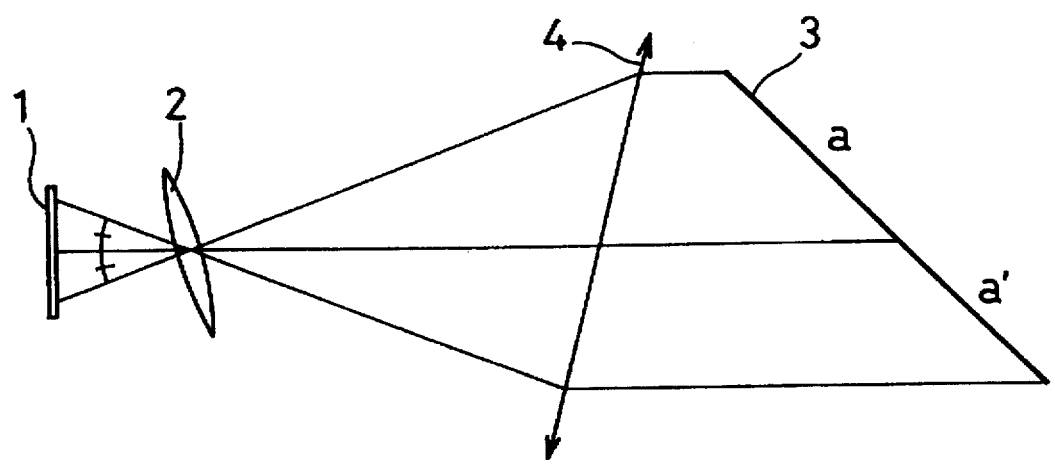
FIG. 16 is an outline diagram showing how distortion is corrected in the imaging optical system of the present invention.

As to how this new distortion arises, a description will be given below, with reference to FIGS. 15 and 16. FIG. 15 is an outline diagram showing an arrangement where a positively powered optical system is used as the reflection optical system. FIG. 16 is a diagram showing the optical system of FIG. 15 with its positively powered reflection optical system replaced with a transmission system equivalent to it for explanation. When a reflection optical system is added, the reflection optical system needs to be disposed at an angle with respect to the optical axis of the projection optical system. That is, unless the reflection optical system is disposed at a predetermined angle, it cannot direct an image toward an area that does not overlap with the projection optical system. However, as seen from FIG. 16, when the positively powered optical system is disposed at an angle with respect to the optical axis of the projection optical system, the principal rays traveling from two points on the object surface that have the same distance from the optical axis of the projection optical system enter the reflection optical system from different heights of incidence, with the result that the corresponding image points on the image surface have different distances a and a' from the intersection between the image surface and the optical axis of the projection optical system.

In the imaging optical system of the present invention, the distortion arising from the above described use of a positively-powered reflection optical system is corrected by adapting one or both of the two constructions as described below.

Figure 17:
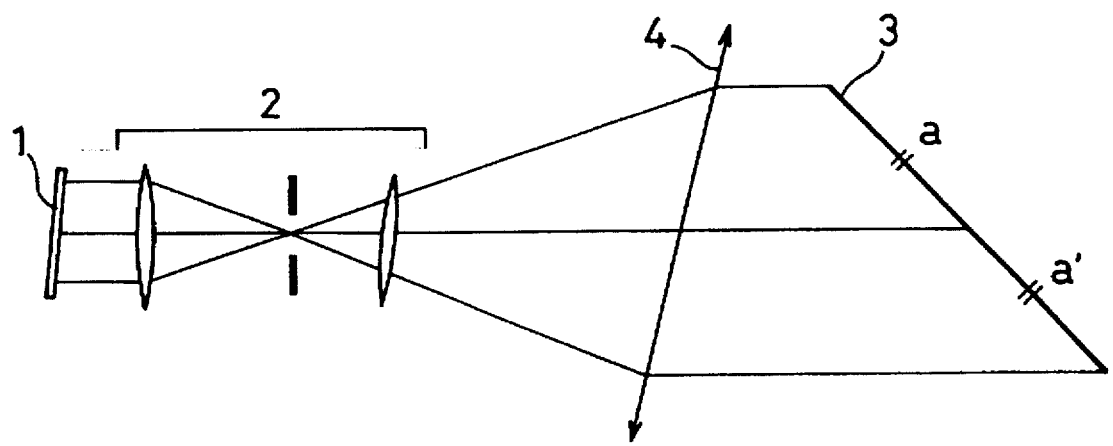
FIG. 17 is an outline diagram showing how distortion is corrected in the imaging optical system of the present invention.

In a first construction to correct the new distortion, as shown in FIG. 17, the projection optical system 2 is divided into a plurality of lens units that are rotationally decentered with respect to one another (in FIG. 17, however, the reflection optical system is shown as a transmission system, for the sake of simplicity). Specifically, within the projection optical system, some lens units (in this case, the image-side lens units) are rotationally decentered in such a way that the principal rays traveling from points on the object surface that have the same distance from the optical axis hit the reflection optical system from the same height of incidence. Such construction of the projection optical system allows the principal rays traveling from points on the object surface that have the same distance from the optical axis to hit the reflection optical system from approximately the same height of incidence, thus correcting the new distortion (cf. the first to fourth embodiments which will be described later).

Figure 18:
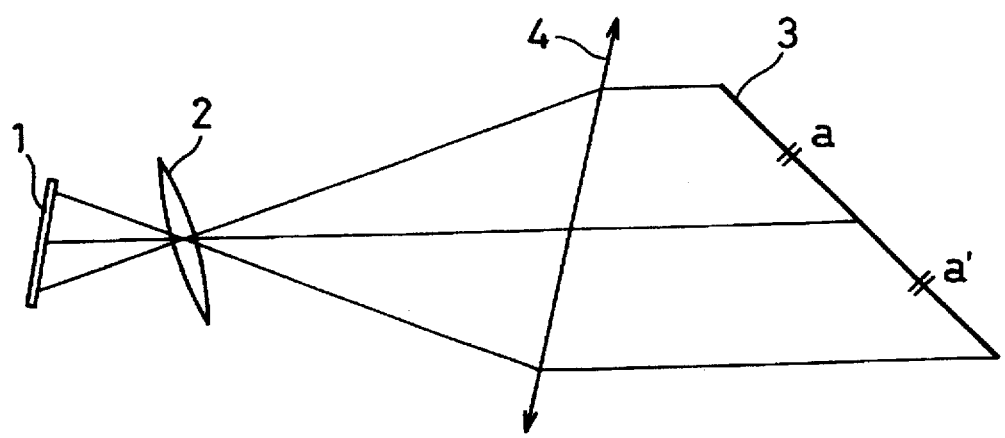
FIG. 18 is an outline diagram showing how distortion is corrected in the imaging optical system of the present invention.
Figure 19:
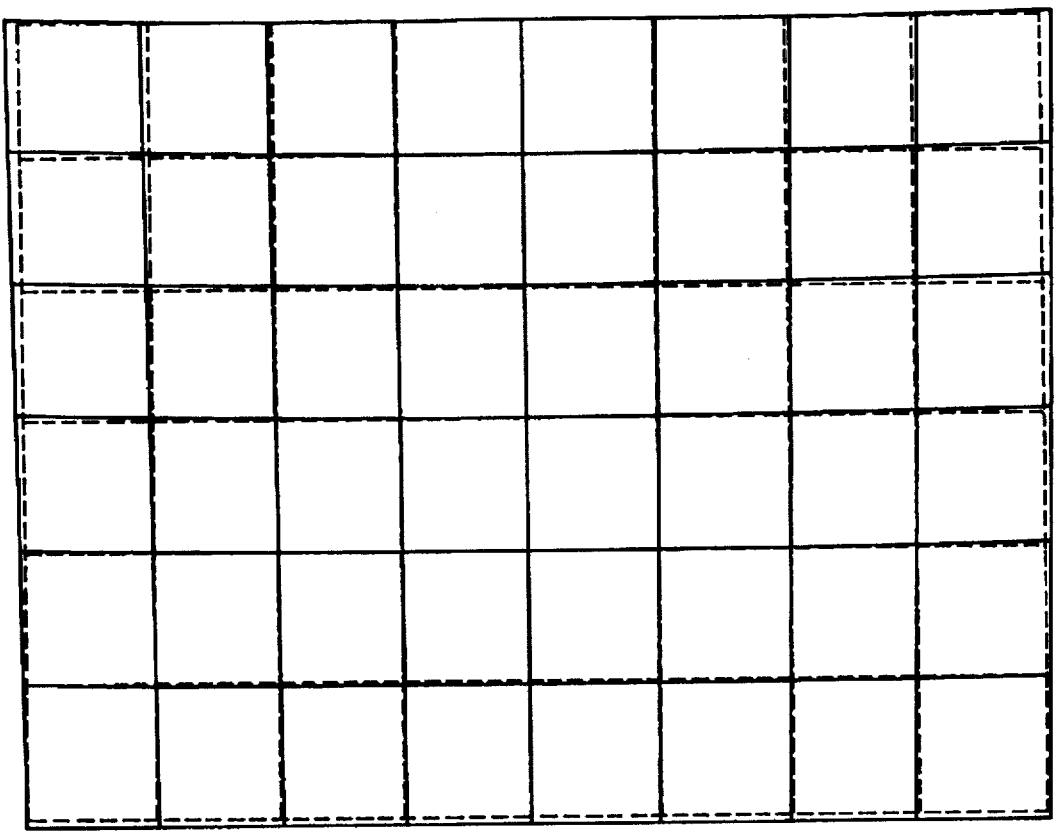
FIG. 19 is a diagram showing the distortion in the first embodiment.
Figure 20:
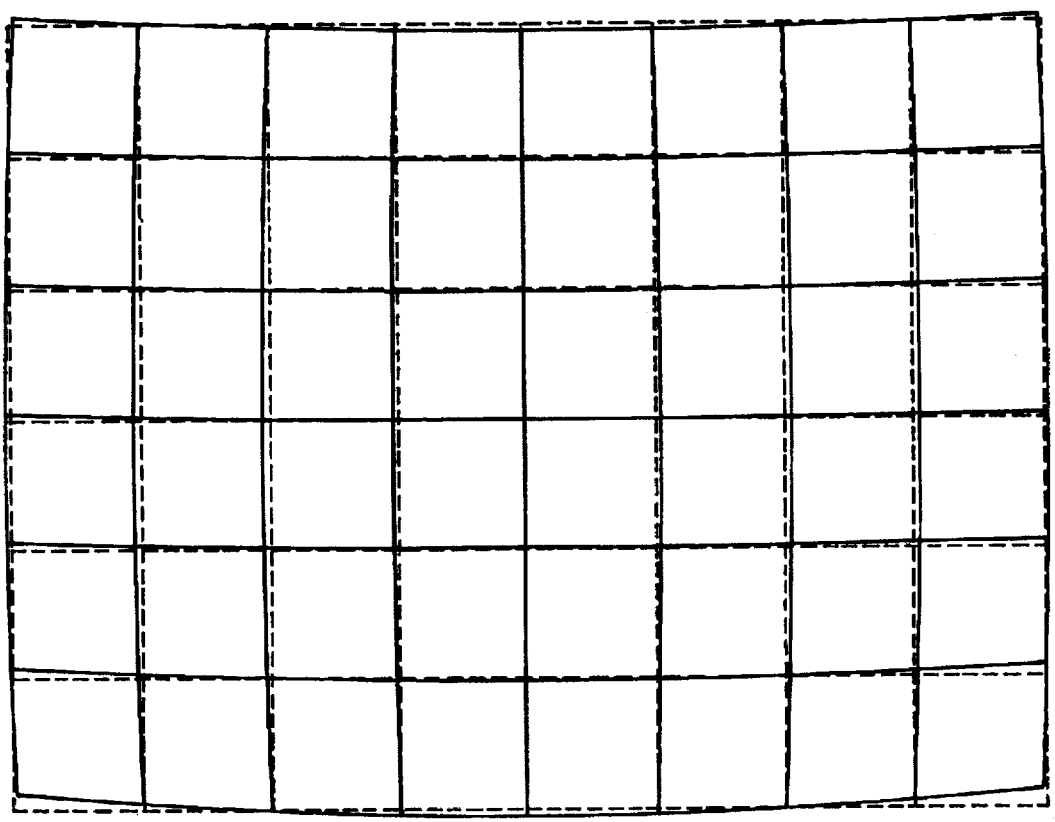
FIG. 20 is a diagram showing the distortion in the second embodiment.
Figure 21:
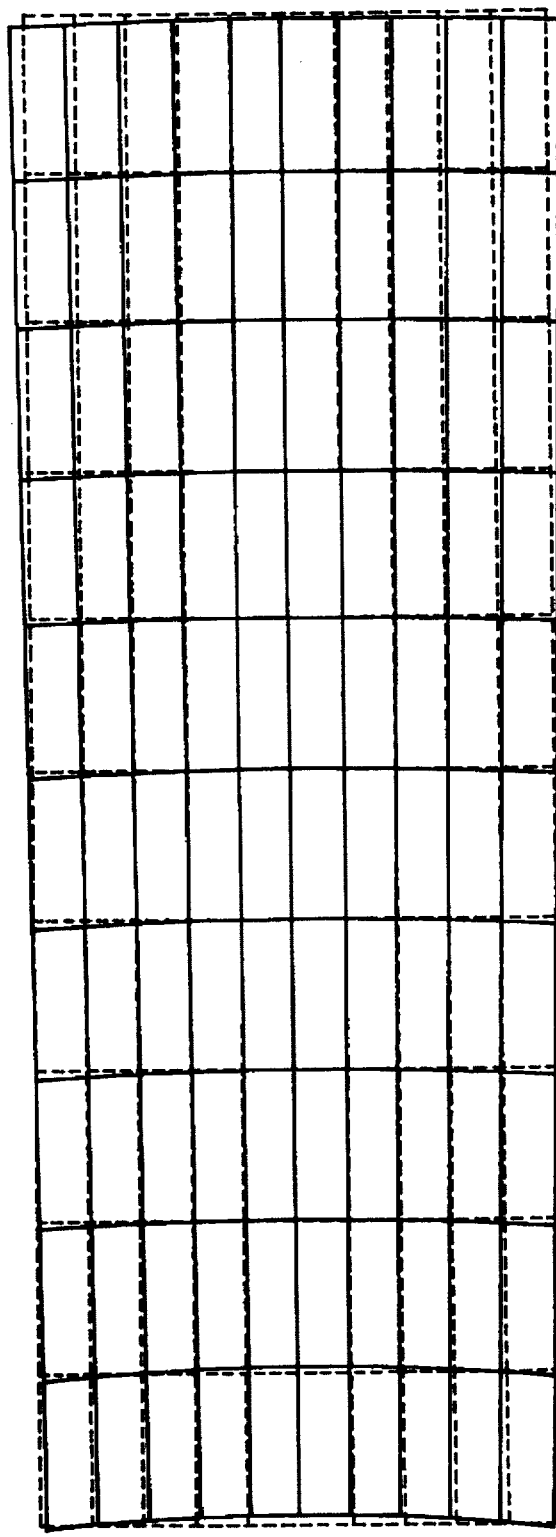
FIG. 21 is a diagram showing the distortion in the third embodiment.
Figure 22:
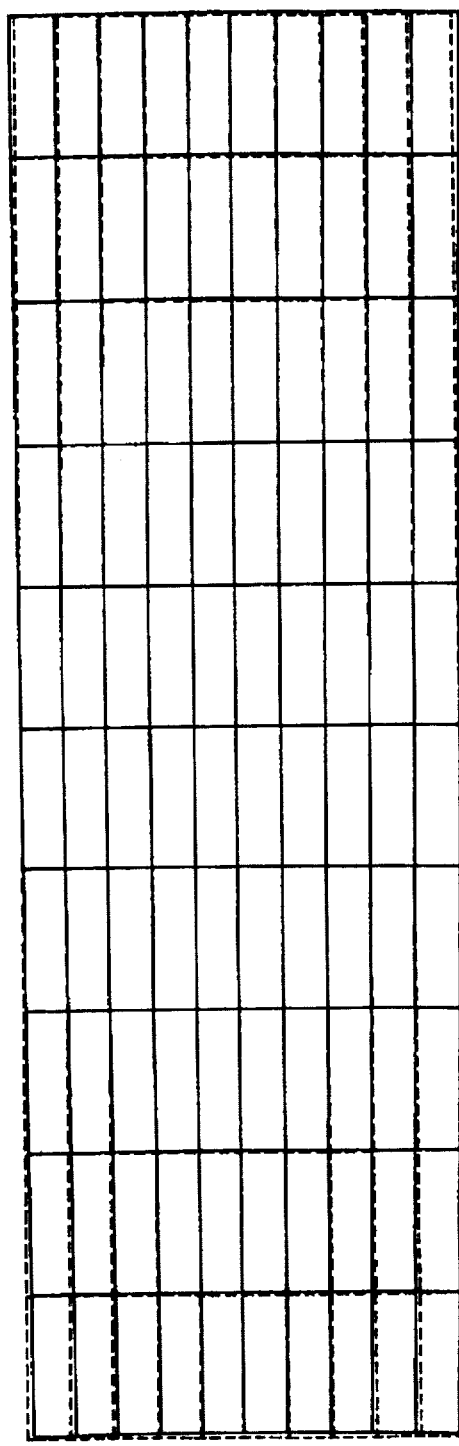
FIG. 22 is a diagram showing the distortion in the fourth embodiment.
Figure 23:
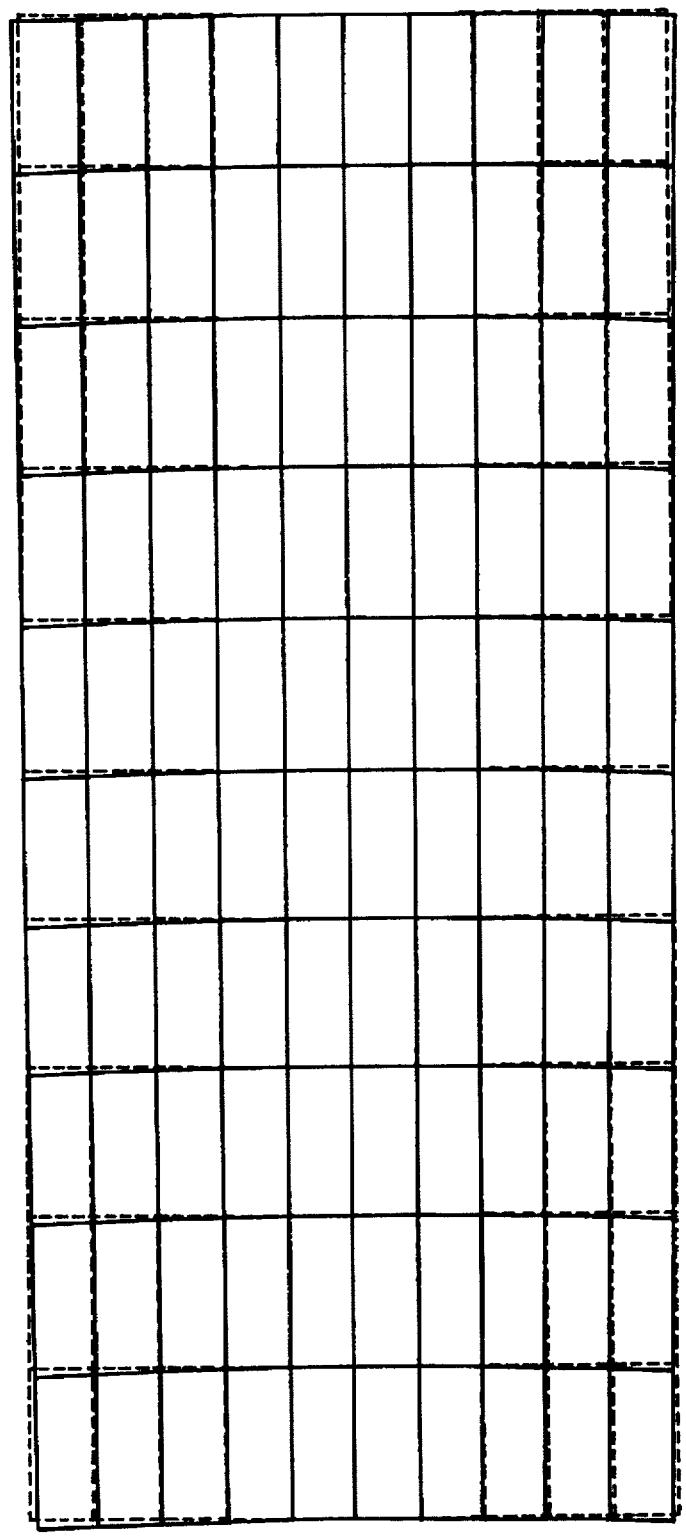
FIG. 23 is a diagram showing the distortion in the fifth embodiment.
Figure 24:
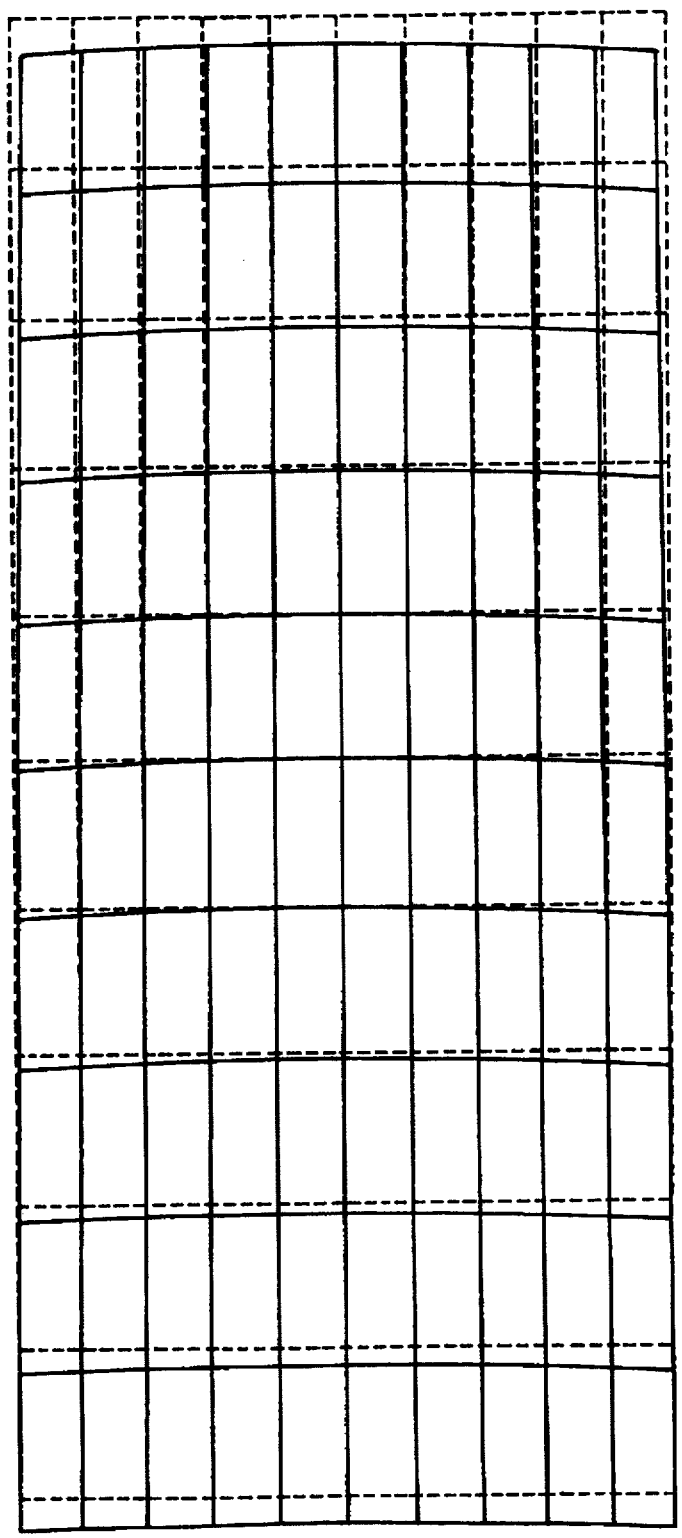
FIG. 24 is a diagram showing the distortion in the sixth embodiment.
Figure 25:
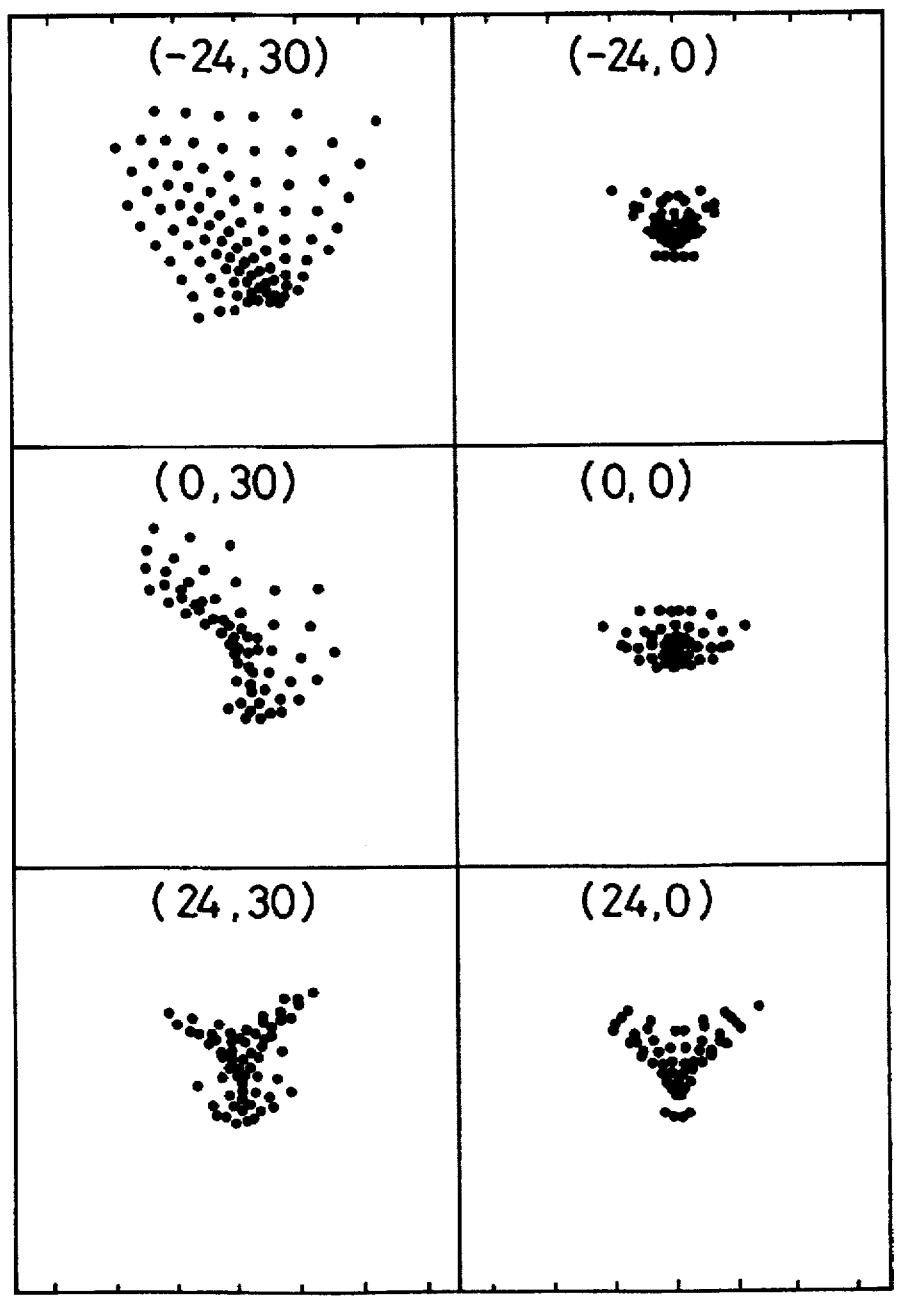
FIG. 25 is a spot diagram of the first embodiment.
Figure 26:
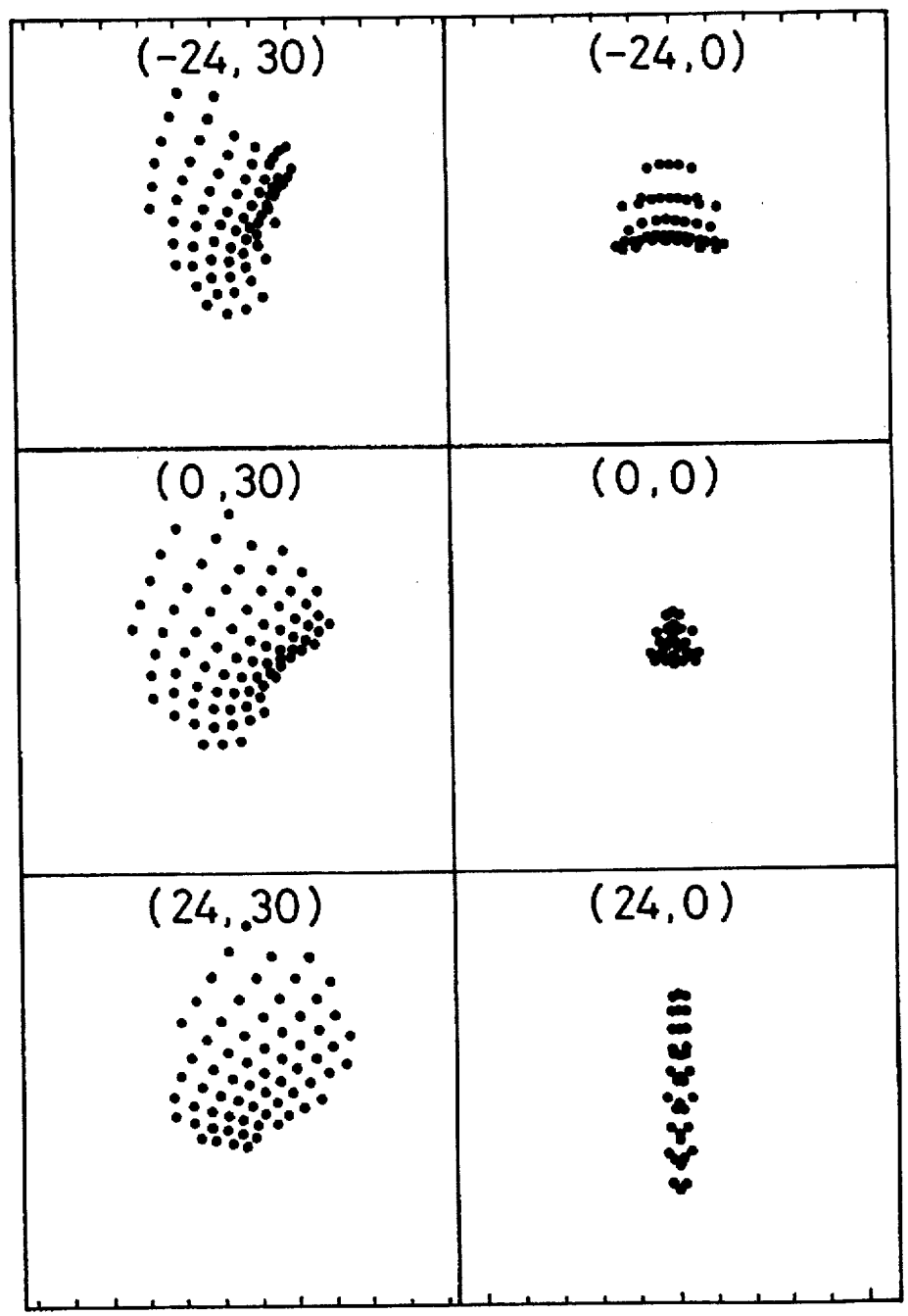
FIG. 26 is a spot diagram of the second embodiment.
Figure 27:
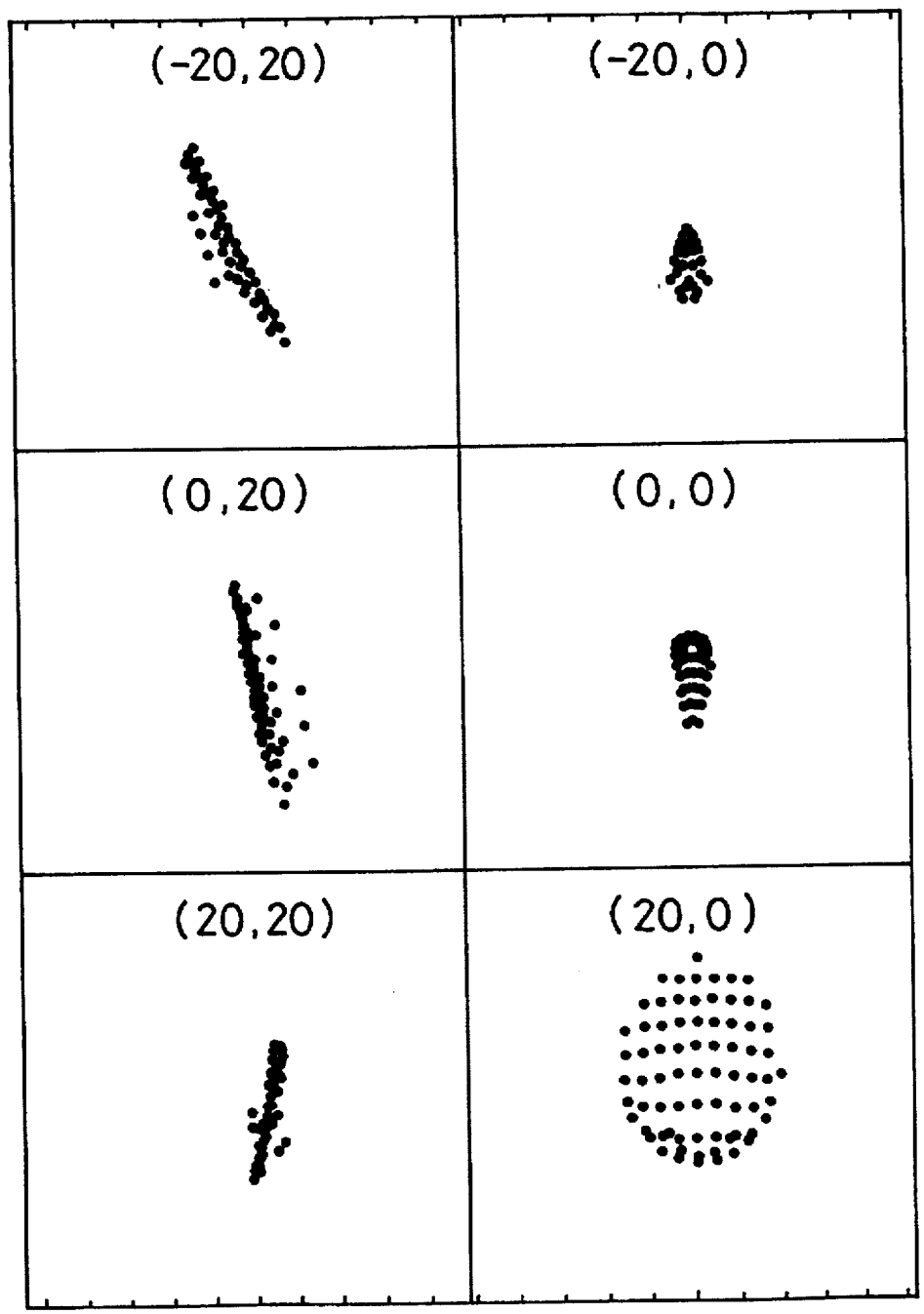
FIG. 27 is a spot diagram of the third embodiment.
Figure 28:
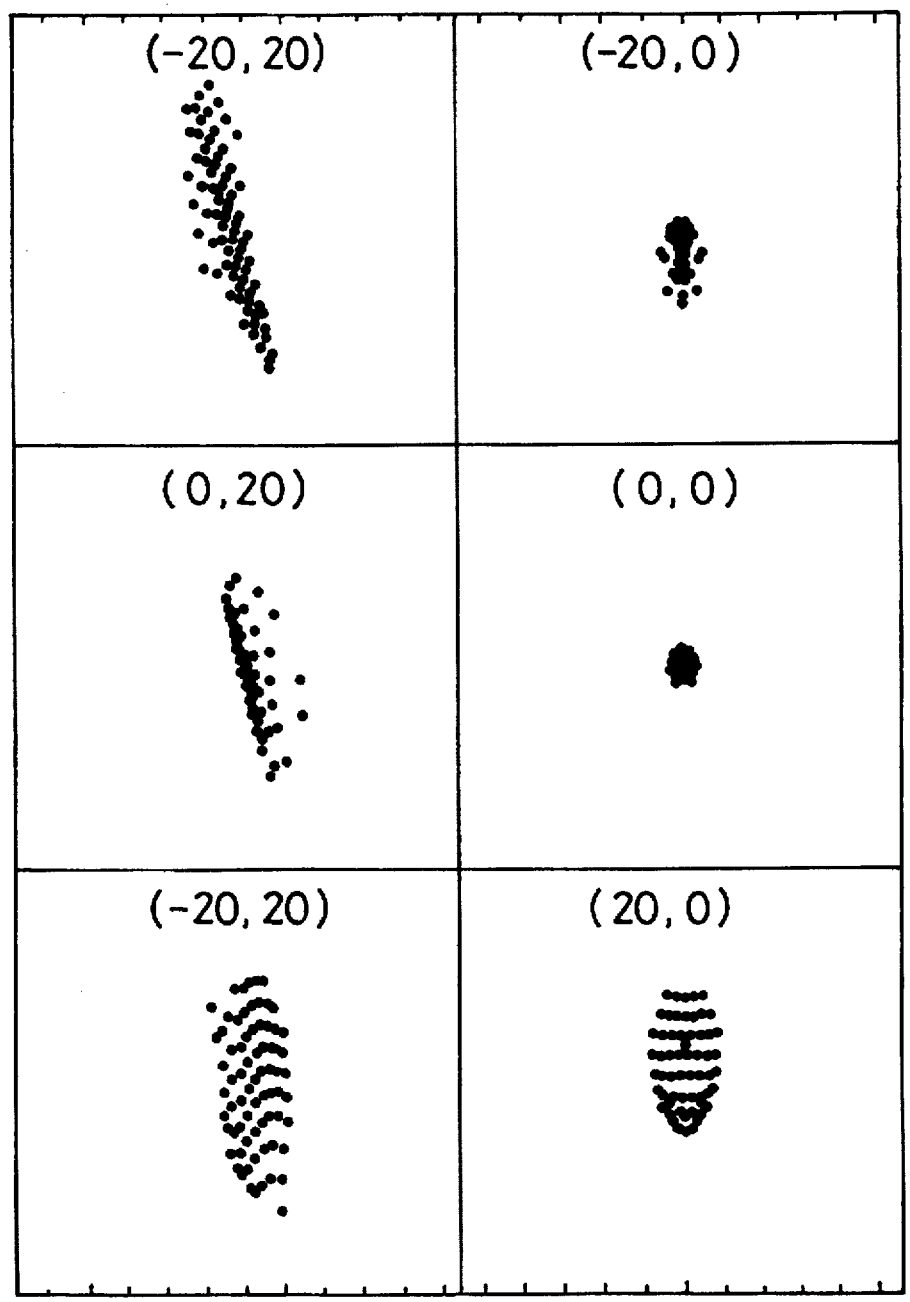
FIG. 28 is a spot diagram of the fourth embodiment.
Figure 29:
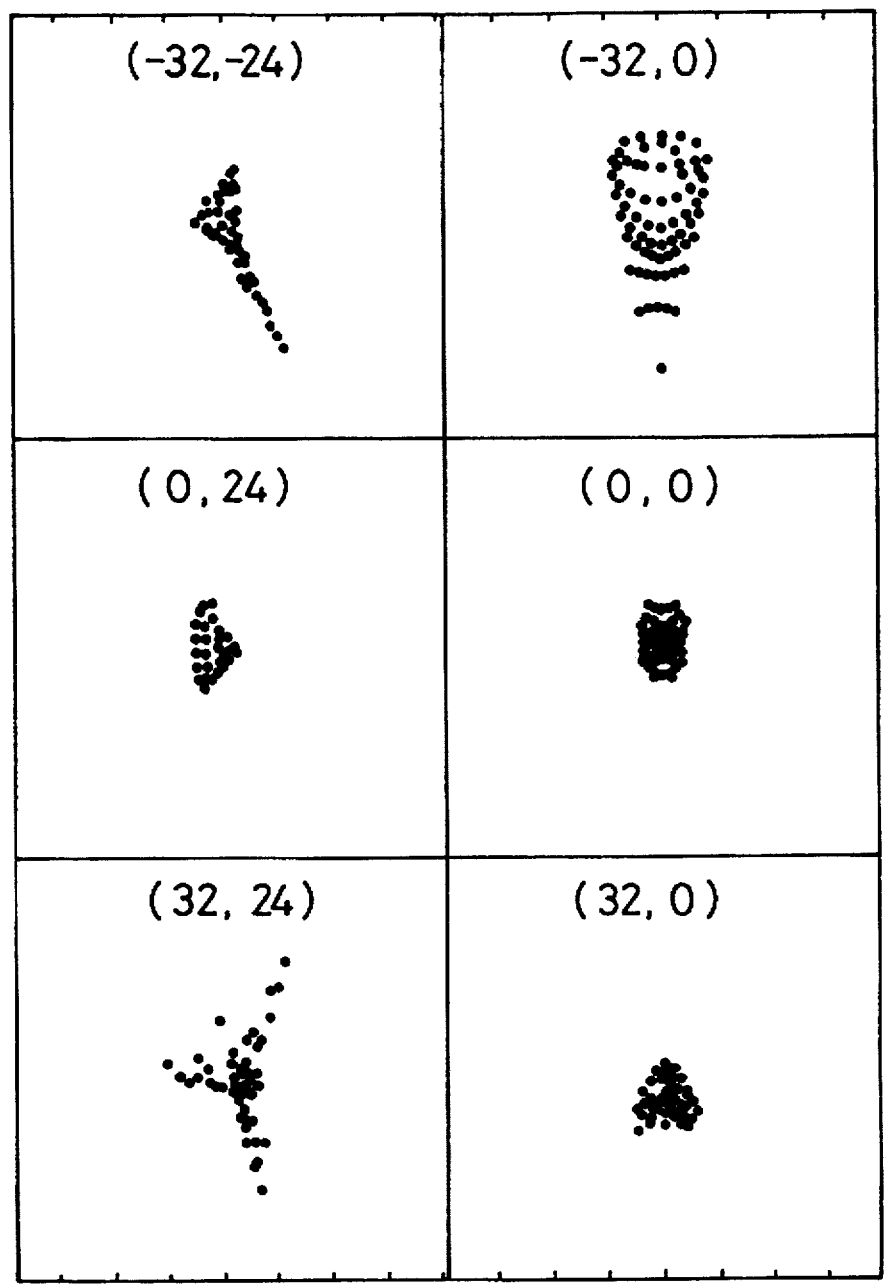
FIG. 29 is a spot diagram of the fifth embodiment.
Figure 30:
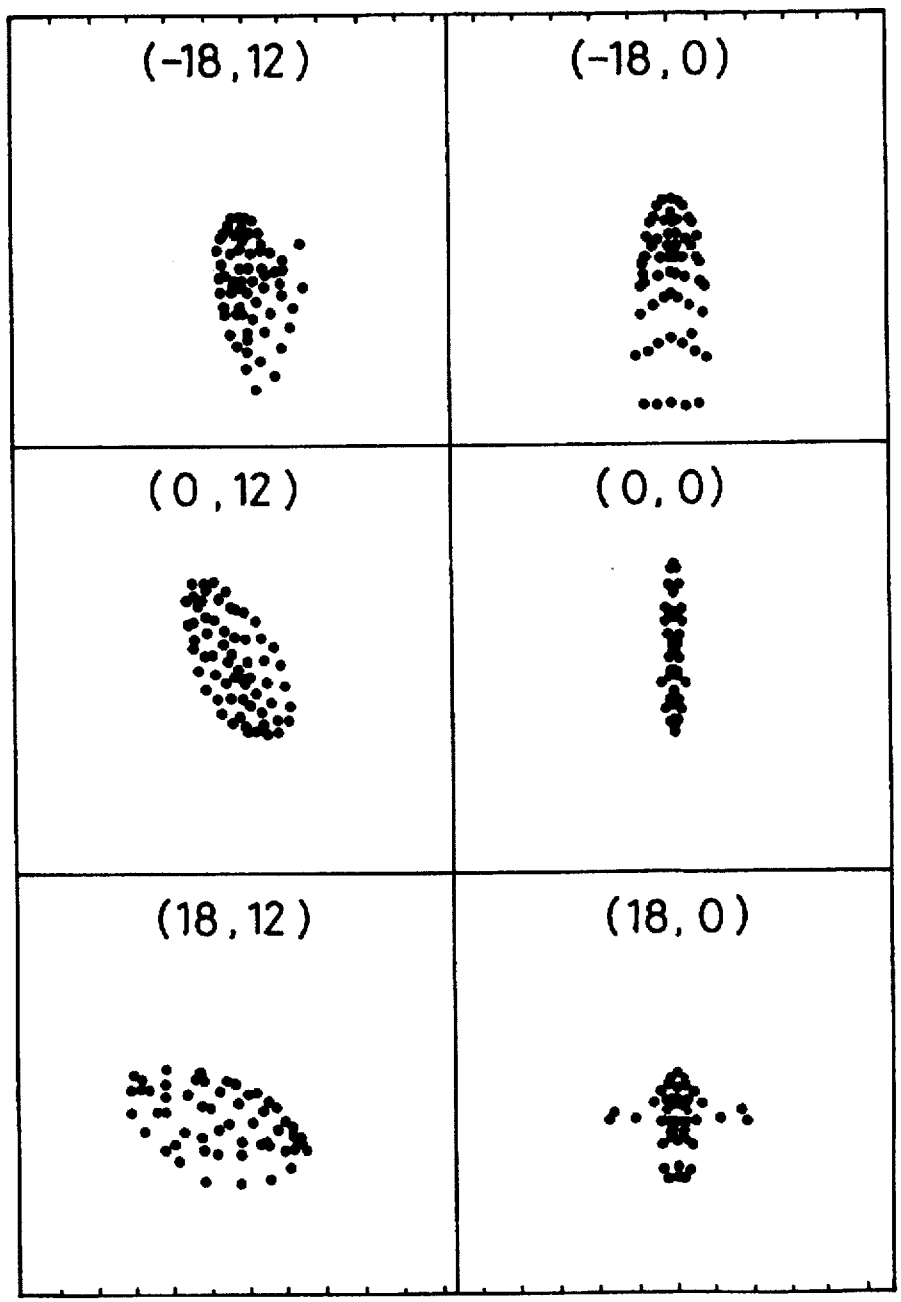
FIG. 30 is a spot diagram of the sixth embodiment.
Figure 31:
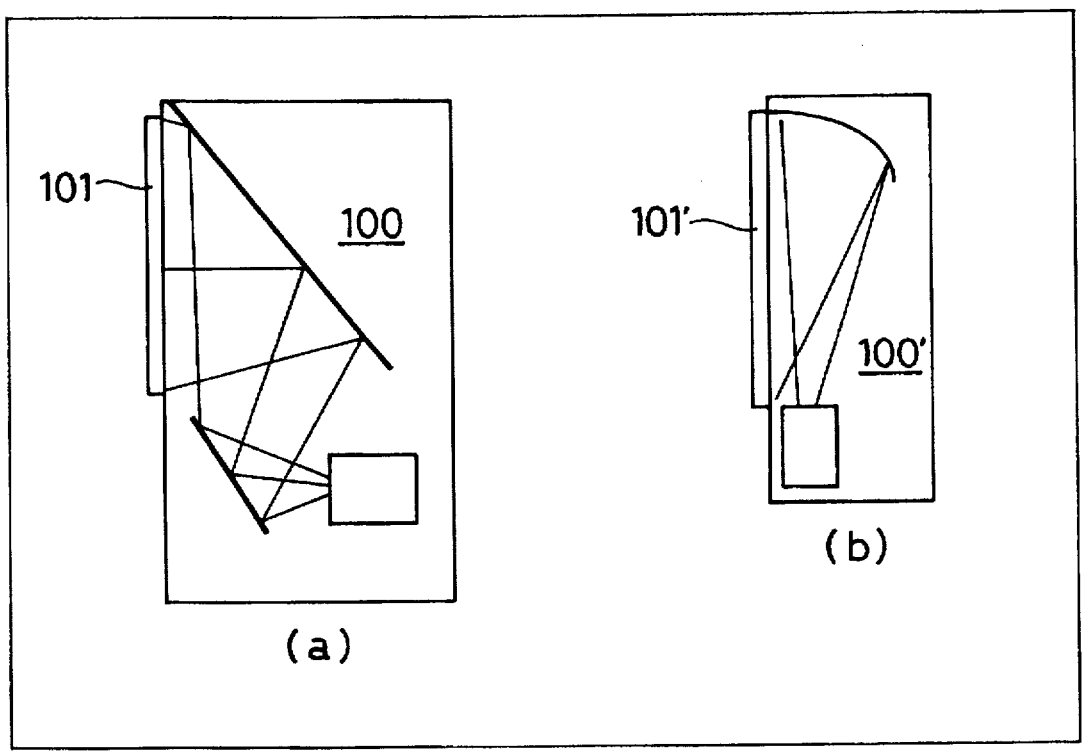
FIG. 31 is an outline diagram comparing an image projection device of a conventional imaging optical system with an image projection device of an imaging optical system of the present invention.
Figure 32:
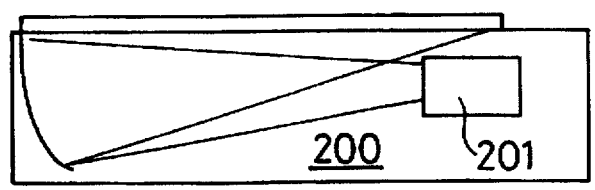
FIG. 32 is an outline diagram showing an image reading device to which the imaging optical system of the present invention is applied.

In a second construction to correct the new distortion, as shown in FIG. 18, the object surface is inclined in the same direction as the reflection optical system with respect to the optical axis of the projection optical system (in FIG. 18, however, the reflection optical system is shown as a transmission system, for the sake of simplicity). Such construction allows the heights of incidence from which principal rays hit the reflection optical system to be corrected, thus correcting the distortion (cf. the second to sixth embodiments which are described later).

Furthermore, it is preferable to adopt a construction as shown in FIG. 17 in which principal rays travel on approximately parallel paths from the object surface into the projection optical system, because such a construction makes it possible to simplify the construction of the projection optical system, and to obtain a higher grade of imaging definition (cf. the third and fourth embodiments which are described later).

Figure 33A:
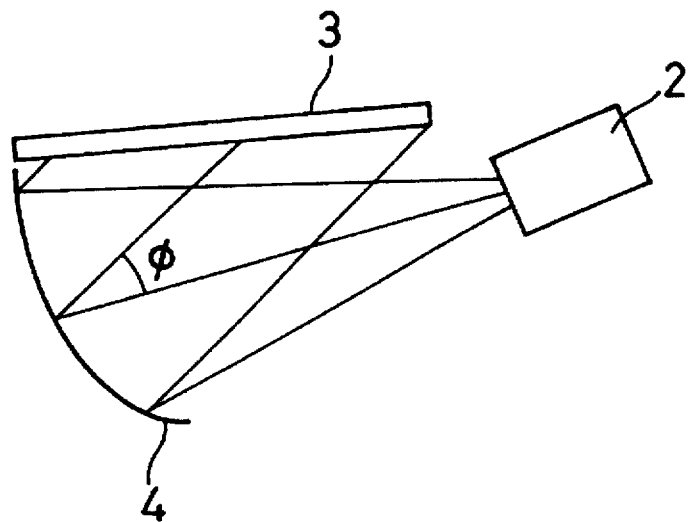
FIG. 33A is an outline diagram showing an example of arrangement of the projection optical system in the present invention.
Figure 33B:
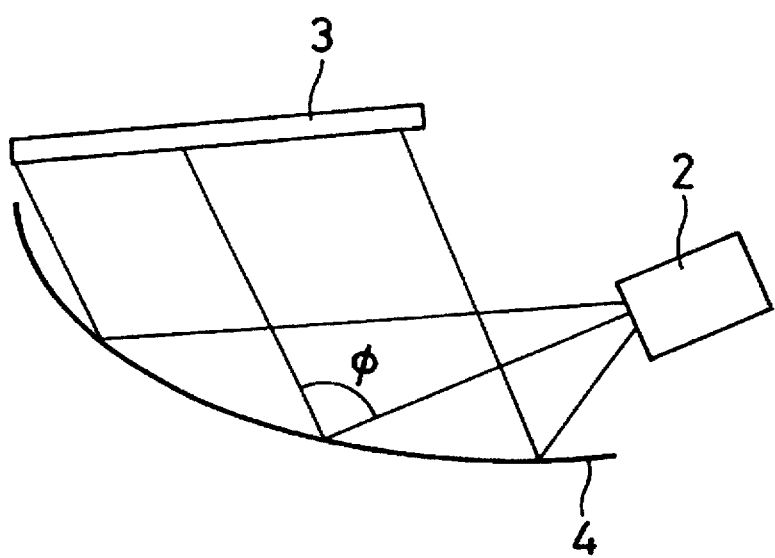
FIG. 33B is an outline diagram showing another example of arrangement of the projection optical system in the present invention.

Moreover, in the imaging optical system of the present invention, it is desirable to adopt an arrangement where the angle φ formed by a base ray when it is reflected by the positively powered reflection optical system 4 is 90° or less. FIGS. 33A is an outline diagram showing an arrangement where the angle φ formed by a base ray when it is reflected by the positively powered reflection optical system 4 is 90° or less, and FIG. 33B is an outline diagram showing an arrangement where the angle φ is 90° or more. Comparison between the constructions of FIGS. 33A and 33B leads to the conclusion that, in making uniform the angles of principal rays incident on the screen disposed on the image surface with respect to the image surface, the construction of FIG. 33A is preferable to that of FIG. 33B, because the former allows the effective diameter of the reflection optical system to be smaller. Specifically, when the angle φ is 90° or less as shown in FIG. 33A, the reflection optical system can be realized with a smaller effective area, allowing the whole imaging optical system to be made more compact. Furthermore, in the construction of FIG. 33A where the angle φ is 90° or less, the reflection points at which light rays are reflected on the reflecting surface of the reflection optical system can be brought closer to the enlargement-side image surface, allowing the image projection device to be made flatter. Moreover, as a general rule, the smaller the angle of reflection at which a base ray is reflected on the positively powered reflecting surface is, the less astigmatism and coma result on the reflecting surface. Accordingly, the construction of FIG. 33A is more advantageous than that of FIG. 33B also in terms of correction of aberration.

As described above, the imaging optical system of the present invention not only corrects distortion properly without forming an intermediate image, but also makes it possible, owing to the use of a reflection optical system, to realize a compact and high-performance imaging optical system.

The Tables 1 to 6 below show the construction data of the embodiments of the imaging optical system according to the present invention. In all the embodiments, the imaging optical system has a primary image surface at the reduction-side end and a secondary image surface at the enlargement-side end, and is constructed as an enlargement optical system so as to be applied to image projection devices.

In the construction data, the following symbols are used:

grpi: the i-th lens (mirror) unit from the reduction-side end;

ri: the i-th surface from the reduction-side end, and its curvature radius;

Ti: the i-th distance from the reduction-side end, and its axial distance;

Ni: refractive index of the medium material of Ti with sodium D-lines, a blank representing the refractive index of air, i.e. 1.00000;

OBJ: the reduction-side image surface (primary image surface);

IMG: the enlargement-side image surface (secondary image surface).

In all the embodiments, all the optical elements belonging to a particular lens unit represented by the symbol grpi are not decentered with respect to one another, but have a common optical axis. On the other hand, the lens units are arranged in such a way that each has a predetermined rotation angle with respect to the next one.

Moreover, the four values given in parentheses after grpi, OBJ, or IMG represent, from left, x-, y-, and z-coordinate values (unit: mm) in the three-dimensional absolute coordinate system defined for the space where the optical system is disposed, and an angle of rotation (unit: degrees) about the z axis.

Here, the coordinate values of grpi represent the coordinate values of the center of the surface disposed closest to the reduction-side end within the i-th lens unit from the reduction-side end. The coordinate values of OBJ and IMG represent the coordinate values of the center of the effective image area of the respective image surface. The x-axis direction of this three-dimensional absolute coordinate system is identical with the optical axis direction of the second lens unit grp2 in the first embodiment, and with the optical axis direction of the first lens unit grp1 in the second to sixth embodiments.

Moreover, the angle of rotation of grpi represents the angle through which the optical axis common within the i-th lens unit from the reduction-side end has been rotated about the z axis with respect to the x axis. The angle of rotation of OBJ and IMG represent the angle through which the normal of the respective image surface has been rotated about the z axis with respect to the x axis. Note that a rotation angle is positive when it represents a clockwise rotation with respect to the x axis.

Moreover, with regard to the reduction-side image surface OBJ, the values following ymax, ymin, xmax, and xmin represent that the reduction-side area is a region confined by the four points (xmax, ymax), (xmin, ymax), (xmax, ymin), and (xmin, ymin).

Furthermore, the asterisk (*) following r for some surfaces indicates that the surface is toric or free-curve surface, whose surface shape is defined by the following equation:

$$f(y, z) = f \text{toric}(y, z) + \Sigma Aij \cdot yi \cdot zj \quad (1)$$

In the above equation, the first term of the right side represents the shape of a toric surface, and the second term represents a free-curve surface (an additional term representing deviation from a quadric surface). More specifically, each term has the significance as described below:

<1> Shape of a Toric Surface

A toric surface is defined as a solution of the following functional equation:

$$f \text{toric}(y, z) = g(z) - \{y^2 + \{f \text{toric}(y, z)\}^2 - \{g(z)\}^2\}/(z \cdot CRZ) = 0 \quad (2)$$

where $$g(z): g(z) = \frac{(CR) \cdot z^2}{1 + \sqrt{(1 - (EPS) \cdot (CR)^2 \cdot z^2)}};$$

CRZ: curvature radius about the z axis;
CR: curvature radius;

EPS: conic coefficient.

<2> Free-Curve Surface

The deviation from a quadric surface is represented by the term $\Sigma Aij \cdot yi \cdot zj$, where Aij: free-curve surface coefficient;

yi: y raised to the power of i;

zj: z raised to the power of j.

In the construction data, the matrices shown under r16* and r10* of the embodiments list free-curve surface coefficients as described above, each column corresponding to a specific value of i and each row corresponding to a specific value of j. For example, the value appearing in the cell i=3, j=2 is a free-curve surface coefficient A23. Moreover, the character E in a coefficient indicates that the digits following it represents an exponent. For example, 1.0E+0.2 represents $1.0 \times 10^2$.

TABLE 1

Construction Data of the First Embodiment

| grp1 | ( −26.376, −20.765, 0.000, 16.624) | | |
|---|---|---|---|
| r1*: | −1360.030 (CRZ: −440.603) | T1 : 21.029 | N1 : 1.69700 |
| r2: | −150.869 | T2 : 26.676 | |
| grp2 | ( 21.329, 0.000, 0.000, 0.000) | | |
| r3 : | 60.875 | T3 : 9.713 | N3 : 1.72900 |
| r4: | 221.388 | T4 : 6.709 | |
| r5: | −150.008 | T5 : 10.915 | N5 : 1.78500 |
| r6: | 232.628 | T6 : 11.627 | |
| r7: | INF (aperture radius: 15.0) | T7 : 2.000 | N7 : 1.50000 |
| r8*: | −165.873 (CRZ: −231.382) | T8 : 3.296 | |
| r9: | −967.904 | T9 : 3.204 | N9 : 1.68900 |
| r10: | 53.466 | T10: 20.829 | N10: 1.80000 |
| r11: | −123.579 | | |
| grp3 | ( 120.852, −4.358, 0.000, 6.010) | | |
| r12: | −37.553 | T12: 8.612 | N12: 1.51600 |
| r13: | −164.736 | | |
| grp4 | ( 161.728, −36.779, 0.000, 46.437) | | |
| r14: | −280.177 | T14: 15.915 | N14: 1.80400 |
| r15*: | 16966.30 (CRZ: −225.486) | | |
| grp5 | (1100.00, 0.858, 0.000, 15.365) | | |
| r16*: | −2752.05 (CRZ: −1882.931) | | |
| | EPS: −1.000 | | |
| OBJ | (−164.372, 16.601, 0.000, −0.870) | | |
| | ymax: 24.000, ymin: −24.000, zmax: 30.000, zmin: −30.000 | | |
| IMG | ( 579.461, 50.000, 0.000, −90.00) | | |

TABLE 2

Construction Data of the Second Embodiment

| grp1 | ( 0.000, 0.507, 0.000, 0.000) | | |
|---|---|---|---|
| r1*: | 288.547 (CRZ: −311.312) | T1 : 21.000 | N1 : 1.69700 |
| r2 : | −204.702 | | |
| grp2 | ( 21.329, 0.000, 0.000, 0.000) | | |
| r3 : | 60.875 | T3 : 9.700 | N3 : 1.72900 |
| r4 : | 171.735 | T4 : 6.722 | |
| r5 : | −150.008 | T5 : 10.900 | N5 : 1.78500 |
| r6 : | 254.752 | T6 : 11.642 | |
| r7 : | INF (aperture radius: 10.0) | T7 : 2.000 | N7 : 1.51600 |
| r8*: | −410.912 (CRZ: −303.817) | T8 : 3.296 | |
| r9 : | −967.904 | T9 : 3.200 | N9 : 1.68900 |
| r10: | 54.3641 | T10: 20.800 | N10: 1.80000 |
| r11: | −110.674 | T11: 38.086 | |
| r12: | −37.8530 | T12: 8.600 | N12: 1.51600 |
| r13: | −332.775 | | |
| grp3 | ( 147.268, −26.369, 0.000, 28.917) | | |
| r14: | −235.006 | T14: 20.000 | N14: 1.80400 |
| r15*: | −167.645 (CRZ: −97.251) | | |
| grp4 | (1100.00, 0.000, 0.000, 10.000) | | |
| r16*: | −3305.05 (CRZ: −1164.491) | | |

TABLE 2-continued

Construction Data of the Second Embodiment

Free-curve Surface Coefficient

| | i=0 | i=2 | i=4 |
|---|---|---|---|
| j=0 | | | −3.60781E-11 |
| 1 | | 2.65585E-07 | |
| 2 | | 2.90330E-10 | |
| 3 | −2.65587E-07 | | |
| 4 | −1.81770E-10 | | |

OBJ (−117.000, 0.000, 0.000, 6.126)
 ymax: 24.000, ymin: −24.000, zmax: 30.000, zmin: −30.000
IMG ( 549.929, 50.000, 0.000, −90.00)

TABLE 3

Construction Data of the Third Embodiment

| grp1 | ( 0.000, | 0.000, 0.000, | 0.000) | | |
|---|---|---|---|---|---|
| r1*: | 80.6218 | | T1 : | 12.702 | N1 : 1.76500 |
| r2 : | −207.716 | | T2 : | 0.544 | |
| r3 : | 57.4861 | | T3 : | 9.073 | N3 : 1.76500 |
| r4 : | 137.219 | | T4 : | 4.536 | |
| r5 : | −227.078 | | T5 : | 7.349 | N5 : 1.51100 |
| r6 : | 33.6790 | | | | |
| grp2 | ( 77.754, | 0.000, 0.000, | −19.597) | | |
| r7 : | INF (aperture radius: 10.0) | | T7 : | 120.00 | |
| r8 : | −149.556 | | T8 : | 20.000 | N8 : 1.51100 |
| r9 : | −144.610 | | T9 : | 1000.0 | |
| r10*: | −2255.16 | | | | |
| | EPS: −2.000 | | | | |

OBJ (−129.700, 0.000, 0.000, −15.500)
 ymax: 20.000, ymin: −20.000, zmax: 20.000, zmin: −20.000
IMG ( 300.000, −260.000, 0.000, 90.00)

TABLE 4

Construction Data of the Fourth Embodiment

| grp1 | ( 0.000, | 0.507, 0.000, | 0.000) | | |
|---|---|---|---|---|---|
| r1 : | 80.6218 | | T1 : | 12.702 | N1 : 1.76500 |
| r2 : | −207.716 | | T2 : | 0.544 | |
| r3 : | 57.4861 | | T3 : | 9.073 | N3 : 1.76500 |
| r4 : | 137.219 | | T4 : | 4.536 | |
| r5 : | −150.008 | | T5 : | 7.349 | N5 : 1.51100 |
| r6 : | 33.6790 | | | | |
| grp2 | ( 77.754, | 0.000, 0.000, | −7.779) | | |
| r7 : | INF (aperture radius: 10.0) | | T7 : | 120.00 | |
| r8 : | −129.215 | | T8 : | 20.00 | N8 : 1.51100 |
| r9 : | −130.320 | | | | |
| grp3 | ( 147.268, | −26.369, 0.000, | 28.917) | | |
| r10*: | −2264.37 | | | | |
| | EPS: −2.000 | | | | |

Free-curve Surface Coefficient

| | i=0 | i=2 | i=4 |
|---|---|---|---|
| j=0 | | 3.55629E-07 | −1.45023E-11 |
| 1 | | −2.76325E-08 | |
| 2 | 9.81704E-07 | −3.22910E-11 | |
| 3 | −2.79288E-10 | | |
| 4 | −8.19994E-12 | | |

OBJ (−129.700, 0.000, 0.000, −17.820)
 ymax: 20.000, ymin: −20.000, zmax: 20.000, zmin: −20.000
IMG ( 233.102, −260.000, 0.000, 90.00)

TABLE 5

Construction Data of the Fifth Embodiment

| grp1 | ( 0.000, | 0.000, 0.000, | 0.000) | | |
|---|---|---|---|---|---|
| r1 : | −1530.36 | | T1 : | 16.000 | N1 : 1.61800 |
| r2 : | −183.579 | | T2 : | 0.500 | |
| r3 : | 133.377 | | T3 : | 16.000 | N3 : 1.49310 |
| r4 : | −890.520 | | T4 : | 4.500 | |
| r5 : | 66.2129 | | T5 : | 24.000 | N5 : 1.61800 |
| r6 : | 439.416 | | T6 : | 5.000 | |
| r7 : | 660.188 | | T7 : | 8.000 | N7 : 1.72100 |
| r8 : | 54.2188 | | T8 : | 41.000 | |
| r9 : | INF (aperture radius: 16.5) | | T9 : | 33.000 | |
| r10: | −44.5843 | | T10: | 8.000 | N10: 1.61950 |
| r11: | −610.590 | | T11: | 4.000 | |
| r12: | −467.703 | | T12: | 22.000 | N12: 1.49310 |
| r13: | −95.6169 | | T13: | 4.500 | |
| r14: | −155.109 | | T14: | 16.000 | N14: 1.49310 |
| r15: | −110.976 | | T15: | 0.500 | |
| r16: | −360.887 | | T16: | 20.000 | N16: 1.69680 |
| r17: | −120.249 | | | | |
| grp2 | (1461.673, | 650.779, 0.000, | −24.00) | | |
| r18: | −3200.00 | | | | |

OBJ (−134.148, 0.000, 0.000, −12.000)
 ymax: 32.000, ymin: −32.000, zmax: 24.000, zmin: −24.000
IMG (1195.49, −212.285, 0.000, 99.675)

TABLE 6

Construction Data of the Sixth Embodiment

| grp1 | ( 0.000, | 0.000, 0.000, | 0.000) | | |
|---|---|---|---|---|---|
| r1 : | 57.9542 | | T1 : | 5.000 | N1 : 1.69680 |
| r2 : | 431.820 | | T2 : | 0.200 | |
| r3 : | 29.2365 | | T3 : | 6.500 | N3 : 1.69680 |
| r4 : | −662.506 | | T4 : | 3.200 | N4 : 1.62004 |
| r5 : | 0.0413402 | | T5 : | 8.600 | |
| r6 : | INF (aperture radius: 10.0) | | T6 : | 8.000 | |
| r7 : | −33.2185 | | T7 : | 4.000 | N7 : 1.62004 |
| r8 : | 308.719 | | T8 : | 5.300 | N8 : 1.77250 |
| r9 : | −42.7407 | | T9 : | 6.400 | |
| r10: | −22.1735 | | T10: | 4.200 | N10: 1.58913 |
| r11: | −29.9537 | | T11: | 0.200 | |
| r12: | −87.0708 | | T12: | 5.500 | N12: 1.78100 |
| r13: | −52.8877 | | | | |
| grp2 | ( 345.677, | 136.756, 0.000, | −23.00) | | |
| r14*: | −700.000 | | | | |
| | EPS: 5.00 | | | | |

OBJ (−74.240, 0.000, 0.000, −20.000)
 ymax: 18.000, ymin: −18.000, zmax: 12.000, zmin: −12.000
IMG (209.120, −74.1437, 0.000, 104.363)

[First Embodiment]

Figure 1:
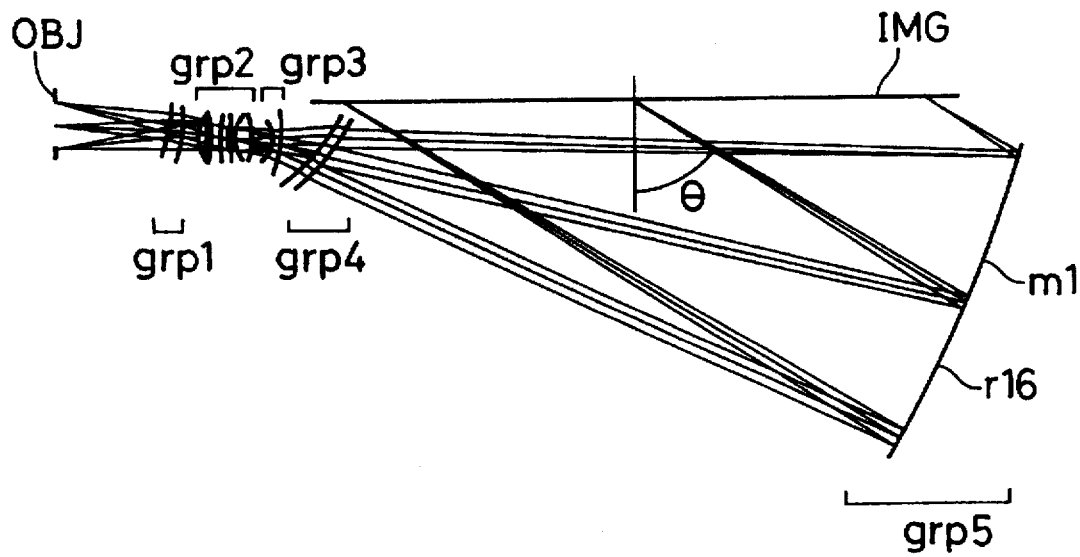
FIG. 1 is a diagram showing the optical paths of a first embodiment of the present invention.
Figure 2:
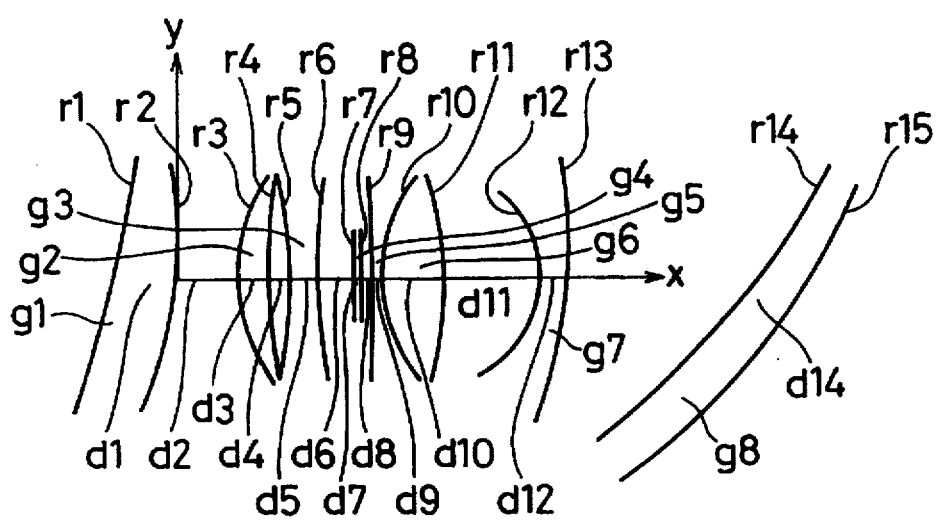
FIG. 2 is a diagram showing the lens arrangement of the projection optical system of the first embodiment.

FIG. 1 is a diagram showing the optical paths in the imaging optical system of the first embodiment, as seen from the direction parallel to the xy plane. FIG. 2 is a diagram showing the details of the projection optical system L1 of the imaging optical system of the first embodiment. The imaging optical system of the first embodiment consists of, from the reduction-side image surface, a first lens unit grp1 having a positive power, a second lens unit grp2 having a negative power, a third lens unit grp3 having a negative power, a fourth lens unit grp4 having a negative power, and a fifth unit grp5. Of these units, the first to fourth lens units grp1 to grp4 constitute a projection optical system L1.

The first lens unit grp1 is composed of only a first lens element g1 that is a positive meniscus lens whose reduction-side image surface is a toric surface with its concave surface facing toward the reduction-side end.

The second lens unit grp2 is composed of, from the reduction-side end, a second lens element g2 that is a positive meniscus lens with its convex surface facing toward the reduction-side end, a third lens element g3 that is a biconcave lens, a fourth lens element g4 that is a planoconvex lens whose reduction-side image surface is a plane surface fitted with an aperture diaphragm and whose enlargement-side image surface is a toric surface with its convex surface facing toward the enlargement-side end, a fifth lens element g5 that is a biconcave lens, and a sixth lens element g6 that is a biconvex lens whose enlargement-side image surface is fitted onto the reduction-side image surface of the fifth lens element g5.

The third lens unit grp3 is composed of only a seventh lens element g7 that is a negative meniscus lens with its concave surface facing toward the reduction-side end.

The fourth lens unit gr4 is composed of only an eighth lens element that is a negative meniscus lens whose reduction-side image surface is a concave surface and whose enlargement-side image surface is a toric surface with its convex surface facing toward the enlargement-side end.

The fifth unit grp5 is composed of only a reflecting surface m1 that is a toric concave surface having a positive power.

In the imaging optical system of the first embodiment, the principal rays incident on the enlargement-side image surface IMG have paths approximately parallel to one another; the angle of incidence θ of the base ray hitting the enlargement-side image side IMG is 56°; the angle φ formed by the base ray on the reflection surface is 19°. Moreover, the longitudinal-to-lateral magnification ratio with which the image on the enlargement-side image surface IMG is formed is approximately 1, and accordingly the image on the reduction-side image surface OBJ is transmitted without deformation.

[Second Embodiment]

Figure 3:
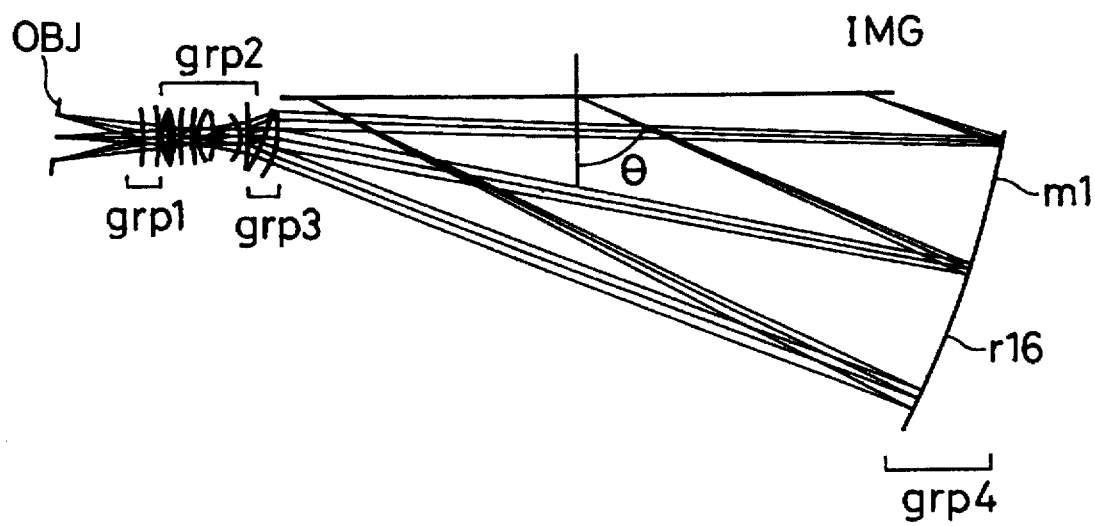
FIG. 3 is a diagram showing the optical paths of a second embodiment of the present invention.
Figure 4:
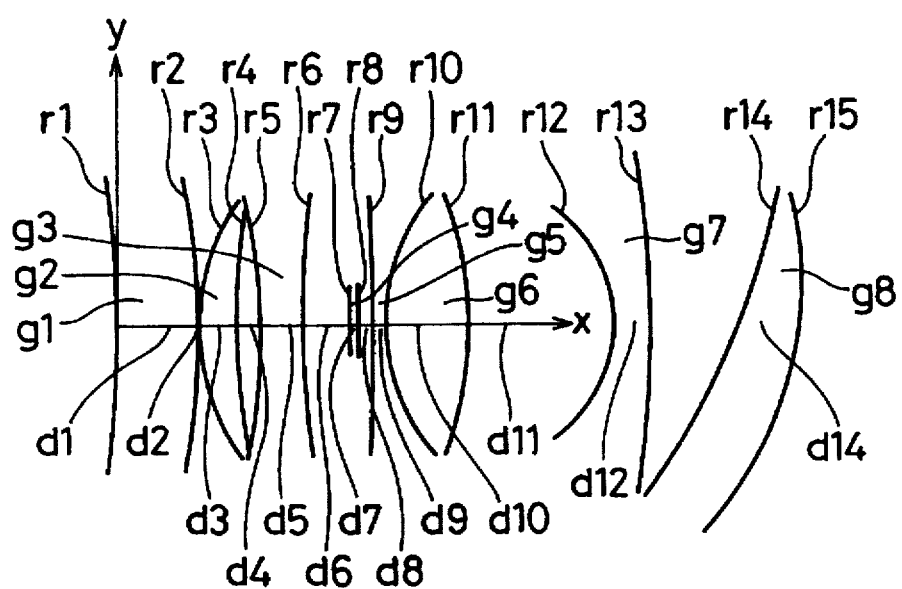
FIG. 4 is a diagram showing the lens arrangement of the projection optical system of the second embodiment.

FIG. 3 is a diagram showing the optical paths in the imaging optical system of the second embodiment, as seen from the direction parallel to the xy plane. FIG. 4 is a diagram showing the details of the projection optical system L1 of the imaging optical system of the second embodiment. The imaging optical system of the second embodiment consists of, from the reduction-side image surface, a first lens unit grp1 having a positive power, a second lens unit grp2 having a negative power, a third lens unit grp3 having a negative power, and a fourth unit grp4. Of these units, the first and third lens units grp1 and grp3 constitute a projection optical system L1.

The first lens unit grp1 is composed of only a first lens element g1, which has at its reduction-side end a saddle-shaped first surface r1 whose cross-section parallel to the zx plane (a plane parallel to the paper sheet on which FIG. 3 is drawn) is concave and whose cross-section parallel to the xy plane (a plane perpendicular to the paper sheet on which FIG. 3 is drawn) is convex, and which has at its enlargement-side end a second surface r2 that is a spherical surface with its convex surface facing toward the enlargement-side end.

The second lens unit grp2 is composed of, from the reduction-side end, a second lens element g2 that is a positive meniscus lens with its convex surface facing toward the reduction-side end, a third lens element g3 that is a biconcave lens, a fourth lens element g4 that is a planoconvex lens whose reduction-side image surface is a plane surface fitted with an aperture diaphragm and whose enlargement-side image surface is a toric surface with its convex surface facing toward the enlargement-side end, a fifth lens element g5 that is a biconcave lens, a sixth lens element g6 that is a biconvex lens whose enlargement-side image surface is fitted onto the reduction-side image surface of the fifth lens element g5, and a seventh lens element g7 that is a negative meniscus lens with its concave surface facing toward the reduction-side end.

The third lens unit grp3 is composed of only an eighth lens element g8 that is a positive meniscus lens whose reduction-side image surface is a concave surface and whose enlargement-side image surface is a toric surface with its convex surface facing toward the enlargement-side end.

The fourth unit gr4 is composed of only a reflecting surface m1 that is a free-curve surface having a positive power.

In the imaging optical system of the second embodiment, the principal rays incident on the enlargement-side image surface IMG have paths approximately parallel to one another; the angle of incidence θ of the base ray hitting the enlargement-side image side IMG is 65°; the angle φ formed by the base ray on the reflection surface is 13°. Moreover, the longitudinal-to-lateral magnification ratio with which the image on the enlargement-side image surface IMG is formed is approximately 1, and accordingly the image on the reduction-side image surface OBJ is transmitted without deformation.

[Third Embodiment]

Figure 5:
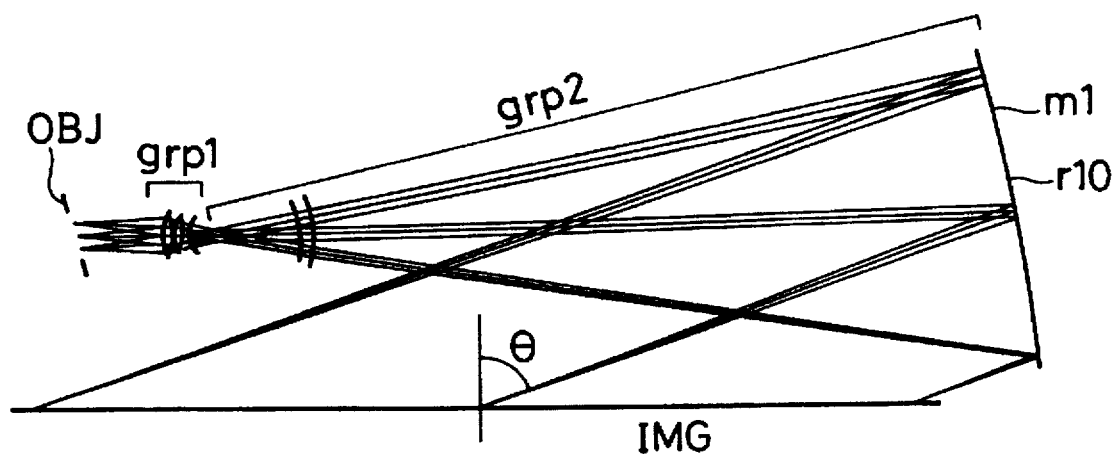
FIG. 5 is a diagram showing the optical paths of a third embodiment of the present invention.
Figure 6:
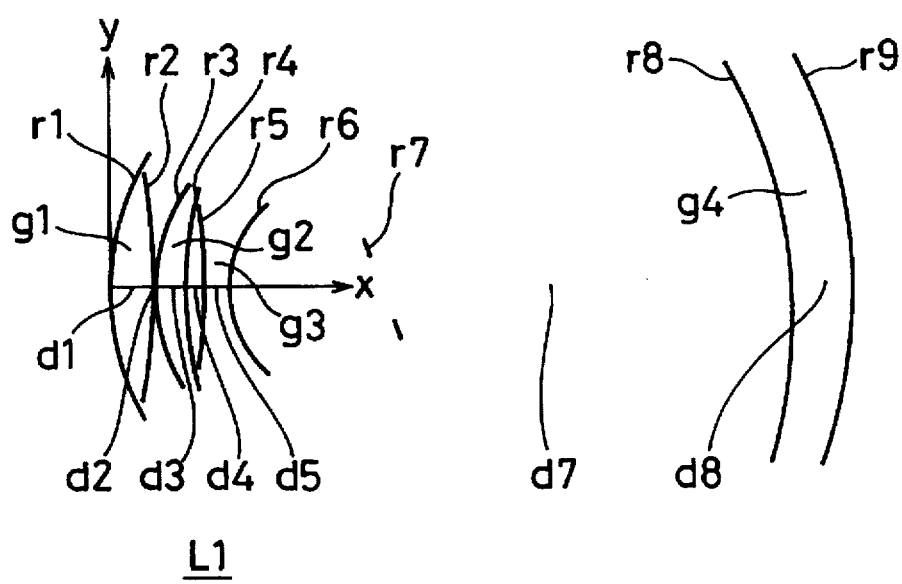
FIG. 6 is a diagram showing the lens arrangement of the projection optical system of the third embodiment.

FIG. 5 is a diagram showing the optical paths in the imaging optical system of the third embodiment, as seen from the direction parallel to the xy plane. FIG. 6 is a diagram showing the details of the projection optical system L1 of the imaging optical system of the third embodiment. The imaging optical system of the third embodiment consists of, from the reduction-side image surface, a first lens unit grp1 having a positive power, and a second lens unit grp2. Of these lens units, the first lens unit grp1 and a part of the second lens unit grp2 constitute a projection optical system L1. Thus, the imaging optical system of the third embodiment has a simple construction in which two optical systems having a common axis are combined.

The first lens unit grp1 is composed of, from the reduction-side end, a first lens element g1 that is a biconvex lens, a second lens element g2 that is a positive meniscus lens with its convex surface facing toward the reduction-side end, and a third lens element g3 that is a biconcave lens.

The second lens unit grp2 is composed of, from the reduction-side end, an aperture diaphragm S, a fourth lens element g4 that is a weakly positive meniscus lens with its concave surface facing toward the reduction-side end, and a reflecting surface m1 that is a free-curve surface having a positive power.

In the imaging optical system of the third embodiment, the principal rays traveling from the reduction-side image surface OBJ into the first lens element g1 and the principal rays incident on the enlargement-side image surface IMG have paths approximately parallel to one another; the angle of incidence θ of the base ray hitting the enlargement-side image side IMG is 70°; the angle φ formed by the base ray on the reflection surface is 18°.

[Fourth Embodiment]

Figure 7:
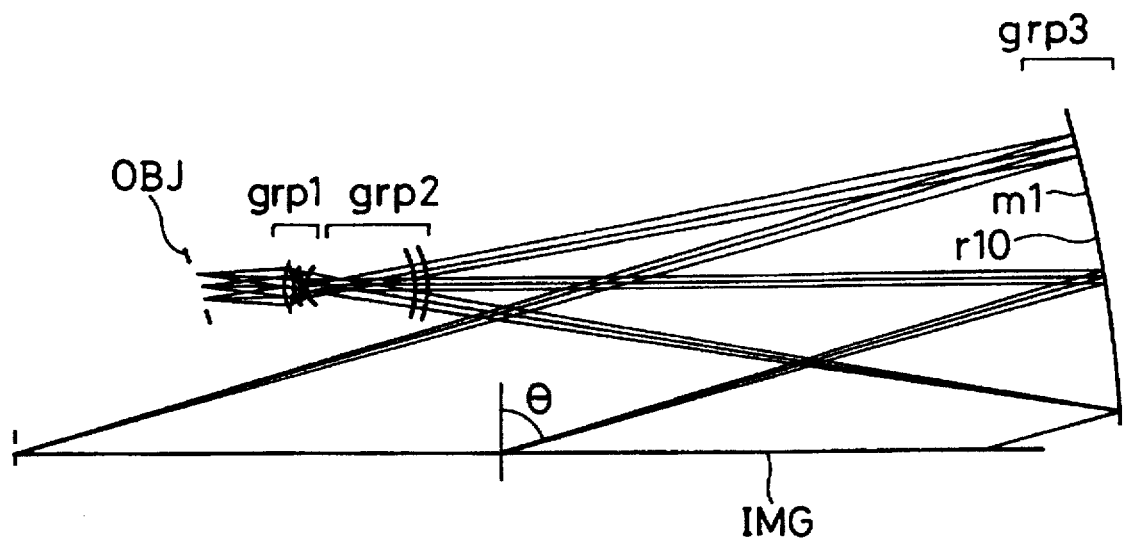
FIG. 7 is a diagram showing the optical paths of a fourth embodiment of the present invention.
Figure 8:
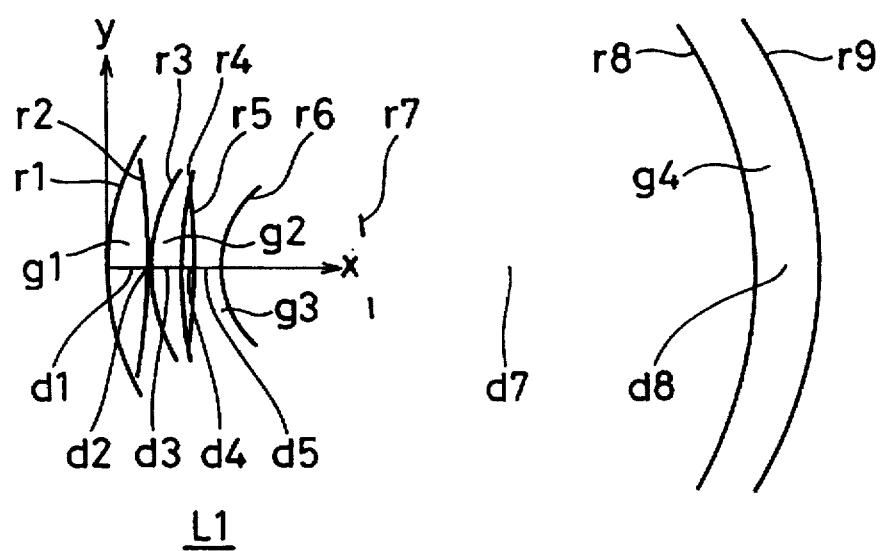
FIG. 8 is a diagram showing the lens arrangement of the projection optical system of the fourth embodiment.

FIG. 7 is a diagram showing the optical paths in the imaging optical system of the fourth embodiment, as seen from the direction parallel to the xy plane. FIG. 8 is a diagram showing the details of the projection optical system L1 of the imaging optical system of the fourth embodiment. The imaging optical system of the fourth embodiment consists of, from the reduction-side image surface, a first lens unit grp1 having a positive power, a second lens unit grp2 having a negative power, and a third unit grp3. Of these units, the first and second lens units grp1 and grp2 constitute a projection optical system L1.

The first lens unit grp1 is composed of, from the reduction-side end, a first lens element g1 that is a biconvex lens, a second lens element g2 that is a positive meniscus lens with its convex surface facing toward the reduction-side end, and a third lens element g3 that is a biconcave lens.

The second lens unit grp2 is composed of, from the reduction-side end, an aperture diaphragm S, and a fourth lens element g4 that is a weakly negative meniscus lens with its concave surface facing toward the reduction-side end.

The third lens unit grp3 is composed of only a reflecting surface m1 that is a free-curve surface having a positive power.

Thus, the imaging optical system of the fourth embodiment is composed of only rotationally symmetric surfaces. As a result, since all the optical elements used here are easy to manufacture, it is possible to provide an inexpensive optical system.

In the imaging optical system of the fourth embodiment, the principal rays traveling from the reduction-side image surface OBJ into the first lens element g1 and the principal rays incident on the enlargement-side image surface IMG have paths approximately parallel to one another; the angle of incidence θ of the base ray hitting the enlargement-side image side IMG is 74°; the angle φ formed by the base ray on the reflection surface is 16°.

[Fifth Embodiment]

Figure 9:
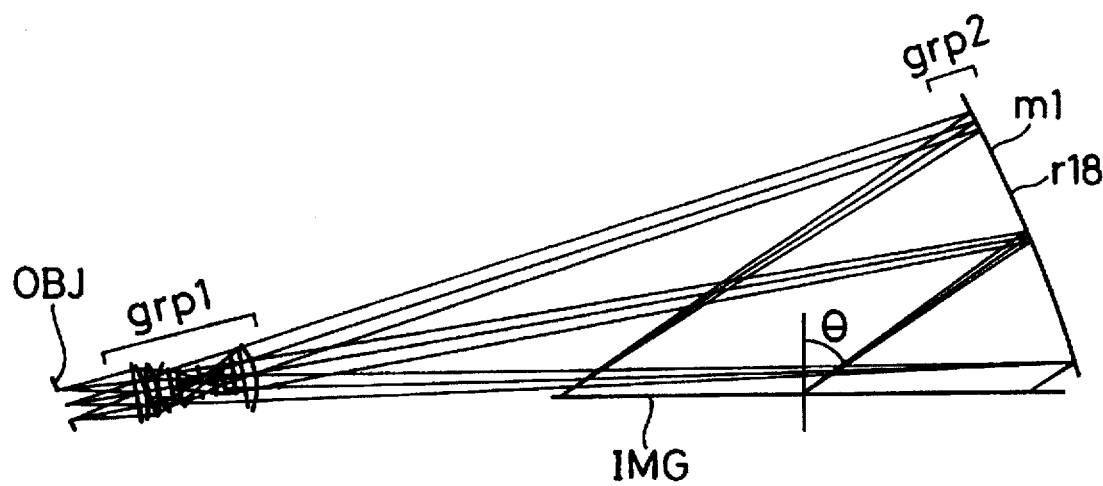
FIG. 9 is a diagram showing the optical paths of a fifth embodiment of the present invention.
Figure 10:
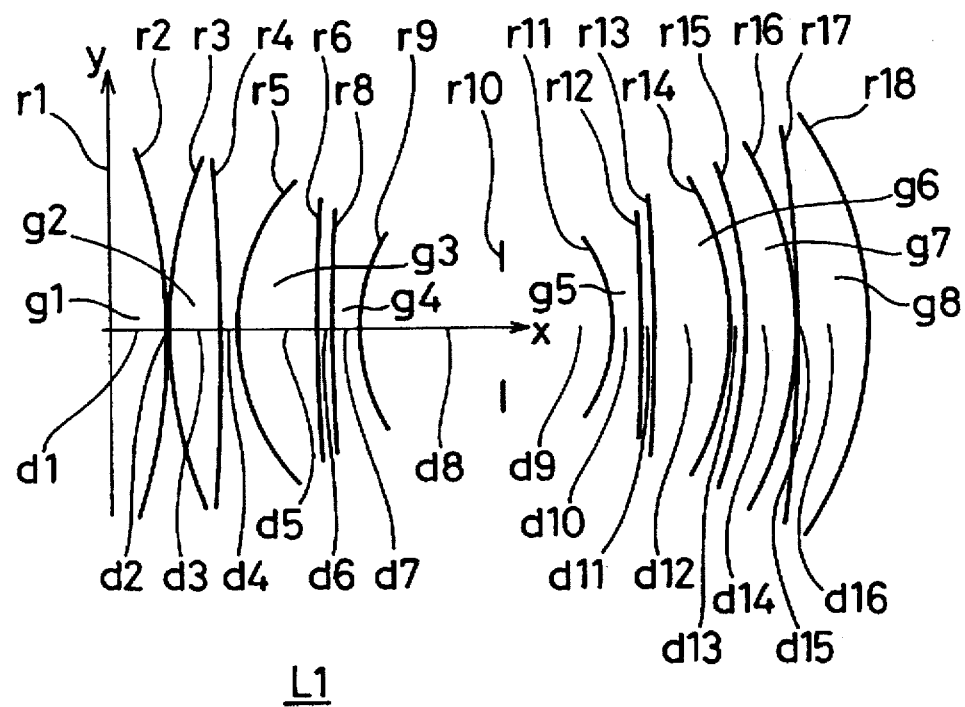
FIG. 10 is a diagram showing the lens arrangement of the projection optical system of the fifth embodiment.

FIG. 9 is a diagram showing the optical paths in the imaging optical system of the fifth embodiment, as seen from the direction parallel to the xy plane. FIG. 10 is a diagram showing the details of the projection optical system L1 of the imaging optical system of the fifth embodiment. The imaging optical system of the fifth embodiment consists of, from the reduction-side image surface, a first lens unit grp1 having a positive power, and a second unit grp2. Of these units, the first lens unit grp1 constitutes a projection optical system L1.

The first lens unit grp1 is composed of, from the reduction-side end, a first lens element g1 that is a positive meniscus lens with its concave surface facing toward the reduction-side end, a second lens element g2 that is a biconvex lens, a third lens element g3 that is a positive meniscus lens with its convex surface facing toward the reduction-side end, a fourth lens element g4 that is a negative meniscus lens with its convex surface facing toward the reduction-side end, an aperture diaphragm S, a fifth lens element g5 that is a negative meniscus lens with its concave surface facing toward the reduction-side end, a sixth lens element g6 that is a positive meniscus lens with its concave surface facing toward the reduction-side end, a seventh lens element g7 that is a positive meniscus lens with its concave surface facing toward the reduction-side end, and an eighth lens element g8 that is a positive meniscus lens with its concave surface facing toward the reduction-side end.

The second unit grp2 is composed of only a reflecting surface m1 that is a spherical surface having a positive power.

Thus, the imaging optical system of the fifth embodiment is composed of only rotationally symmetric surfaces. As a result, since all the optical elements used here are easy to manufacture, it is possible to provide an inexpensive optical system.

In the imaging optical system of the fifth embodiment, the principal rays traveling from the reduction-side image surface OBJ into the first lens element g1 and the principal rays incident on the enlargement-side image surface IMG have paths approximately parallel to one another; the angle of incidence θ of the base ray hitting the enlargement-side image side IMG is 55°; the angle φ formed by the base ray on the reflection surface is 24°. Furthermore, in the imaging optical system of the fifth embodiment, the reduction-side image surface OBJ is disposed in such a way that it is inclined in the same direction as the reflecting surface m1 with respect to the base ray.

[Sixth Embodiment]

Figure 11:
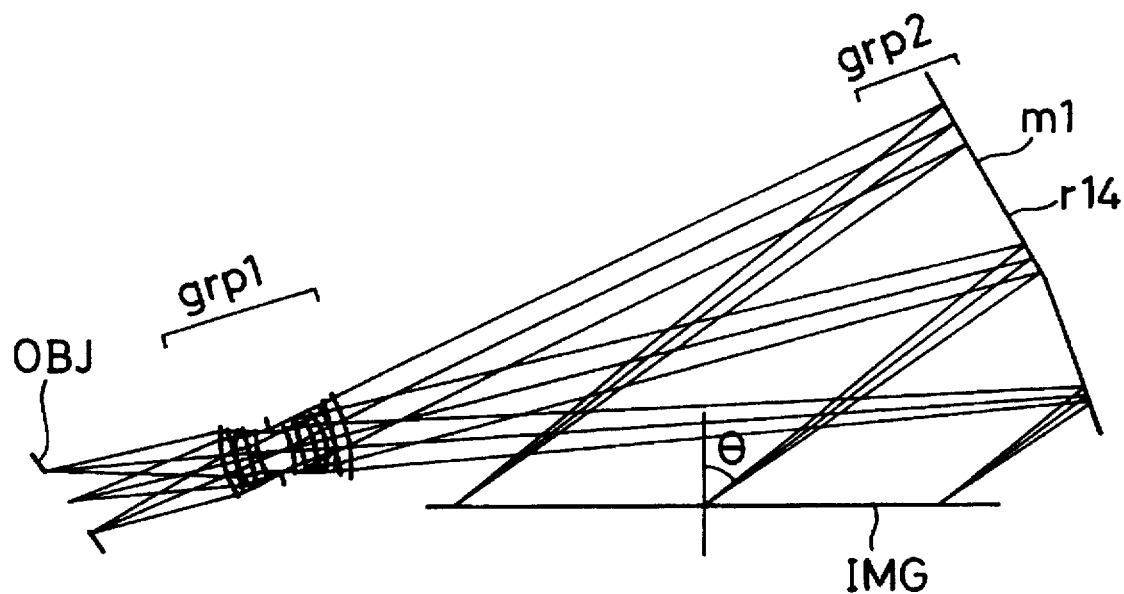
FIG. 11 is a diagram showing the optical paths of a sixth embodiment of the present invention.
Figure 12:
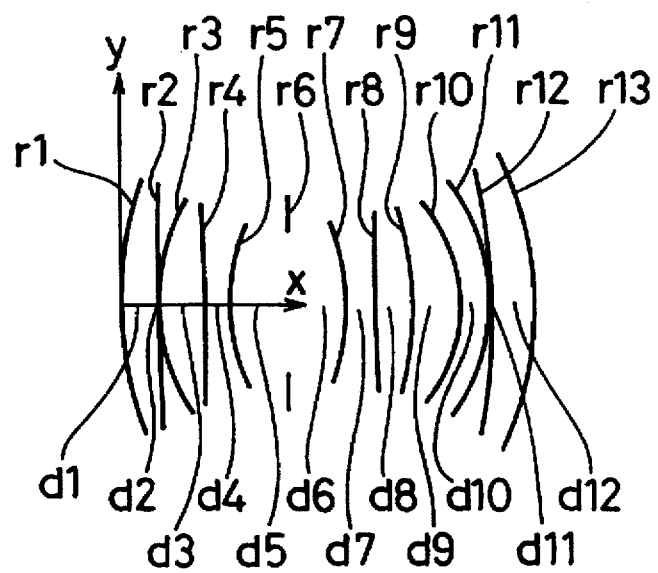
FIG. 12 is a diagram showing the lens arrangement of the projection optical system of the sixth embodiment.

FIG. 11 is a diagram showing the optical paths in the imaging optical system of the sixth embodiment, as seen from the direction parallel to the xy plane. FIG. 12 is a diagram showing the details of the projection optical system L1 of the imaging optical system of the sixth embodiment. The imaging optical system of the sixth embodiment consists of, from the reduction-side image surface, a first lens unit grp1 having a positive power, and a second unit grp2. Of these units, the first lens unit grp1 constitutes a projection optical system L1.

The first lens unit grp1 is composed of, from the reduction-side end, a first lens element g1 that is a positive meniscus lens with its convex surface facing toward the reduction-side end, a second lens element g2 that is a biconvex lens, a third lens element g3 that is a biconcave lens whose reduction-side image surface is fitted onto the enlargement-side image surface of the second lens element g2, an aperture diaphragm S, a fourth lens element g4 that is a biconcave lens, a fifth lens element g5 that is a biconvex lens whose reduction-side end is fitted onto the enlargement-side image surface of the fourth lens element g4, a sixth lens element g6 that is a weakly negative meniscus lens with its concave surface facing toward the reduction-side end, and a seventh lens element g7 that is a positive meniscus lens with its concave surface facing toward the reduction-side end.

The second lens unit grp2 is composed of only a reflecting surface m1 that is a spherical surface having a positive power.

Thus, the imaging optical system of the sixth embodiment is also composed of only rotationally symmetric surfaces. As a result, since all the optical elements used here are easy to manufacture, it is possible to provide an inexpensive optical system.

In the imaging optical system of the sixth embodiment, the principal rays traveling from the reduction-side image surface OBJ into the first lens element g1 and the principal rays incident on the enlargement-side image surface IMG have paths approximately parallel to one another; the angle of incidence θ of the base ray hitting the enlargement-side image side IMG is 53°; the angle φ formed by the base ray on the reflection surface is 23°. Furthermore, in the imaging optical system of the sixth embodiment, the reduction-side image surface OBJ is disposed in such a way that it is inclined in the same direction as the reflecting surface m1 with respect to the base ray.

[Aberration in the Embodiments]

FIGS. 19 to 24 are diagrams showing the distortion arising in the imaging optical system of each embodiment. The diagrams show the look of the enlargement-side image surface IMG when an image with a latticed pattern is placed on the reduction-side image surface OBJ, the size of each lattice block being 60 mm×48 mm in the first, second, and fifth embodiments, 40 mm×40 mm in the third and fourth embodiments, and 36 mm×24 mm in the sixth embodiment. In the diagrams, solid lines represent the actually obtained image, whereas broken lines represent the reference image that does not include any distortion.

FIGS. 25 to 30 are spot diagrams of the imaging optical system of the first to sixth embodiments. In the diagrams, the values given as coordinate values represent the corresponding y- and z-coordinate values on the reduction-side image surface.

[Modified Embodiments]

The imaging optical system of the present invention can be modified so as to be suitably used in applications other than the embodiments as described above, as long as the essential aspects of the invention are not altered.

For example, although the reflection optical system is realized by the use of a concave mirror in the above embodiments, it can also be realized with a combination including a refraction system, such as a combination of a positive lens and a plane mirror, or a combination of a negative lens and a concave mirror.

Moreover, it is needless to say that the imaging optical system of the above embodiments, when modified to have a primary image surface at the enlargement-side end and a secondary image surface at the reduction-side end, can be used as an optical system in an image reading device.

As described above, the imaging optical system of the present invention can correct distortion properly, despite its simple construction without any special optical element such as a Fresnel reflection mirror. Moreover, since there is no need to form an intermediate image in the middle of optical paths, the optical system as a whole can be constructed compactly.

Furthermore, the imaging optical system of the present invention, when applied to image projection devices and image reading devices, contributes to making such devices flatter and to making their screens wider, without degrading the quality of images formed.

What is claimed is:

1. An imaging optical system for transmitting a primary image to form an enlarged or reduced secondary image without forming an intermediate image in the middle of optical paths, comprising:

a projection optical system; and a reflection optical system having a positive power and disposed in such a way that its optical axis forms an angle other than a right angle with respect to a enlargement-side image surface, wherein all principal rays between said reflection optical system and said enlargement-side image surface form a uniform angle with respect to the enlargement-side image surface and a base ray incident on a reflection surface of said reflection optical system forms an angle of 90° or less with respect to a base ray reflected by the reflection optical system.

2. An imaging optical system as claimed in claim 1, wherein a normal of the reflection surface of said reflection optical system has a direction approximately identical with a normal of a reduction-side image surface and does not have a direction approximately identical with an optical axis of said projection optical system.

3. An imaging optical system as claimed in claim 1, wherein optical elements constituting said projection optical system are arranged symmetrically about an axis.

4. An imaging optical system as claimed in claim 1, wherein all principal rays between said projection optical system and a reduction-side image surface form a uniform angle with respect to the reduction-side image surface.

5. An image projection device, comprising:

an image providing means for providing a primary image;

a screen on which a secondary image is projected;

a projection optical system; and a reflection optical system having a positive power and disposed in such a way that its optical axis forms an angle other than a right angle with respect to the screen, wherein all principal rays between said reflection optical system and said screen form a uniform angle with respect to the screen and a base ray incident on a reflection surface of said reflection optical system forms an angle of 90° or less with respect to a base ray reflected by the reflection optical system.

6. An image reading apparatus, comprising:

an image providing surface for providing a primary image;

an image projection surface for projecting a secondary image on;

a reflection optical system having a positive power and disposed in such a way that its optical axis forms an angle other than a right angle with respect to the image providing surface; and a projection optical system, wherein all principal rays between said reflection optical system and said image providing surface form a uniform angle with respect to the image providing surface and a base ray incident on a reflection surface of said reflection optical system forms an angle of 90° or less with respect to a base ray reflected by the reflection optical system.

* * * * *